(12) United States Patent
Yaseen et al.

(10) Patent No.: US 10,466,885 B2
(45) Date of Patent: *Nov. 5, 2019

(54) TRANSACTIONAL CONVERSATION-BASED COMPUTING SYSTEM

(71) Applicant: ServiceNow, Inc., Santa Clara, CA (US)

(72) Inventors: Rahim Yaseen, Redwood City, CA (US); Xiaomei Zhang, Palo Alto, CA (US); Hasan Rizvi, Santa Clara, CA (US); Sean Frogner, Santa Clara, CA (US); Muruganantham Chinnananchi, Santa Clara, CA (US); Michael Fortson, Tiburon, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,197

(22) Filed: Dec. 27, 2017

(65) Prior Publication Data

US 2018/0341396 A1 Nov. 29, 2018

Related U.S. Application Data

(63) Continuation of application No. 15/717,787, filed on Sep. 27, 2017.

(Continued)

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06F 16/252* (2019.01);
(Continued)

(58) Field of Classification Search
CPC ....... G06Q 30/016; G06Q 50/01; H04L 51/04
See application file for complete search history.

(56) References Cited

U.S. PATENT DOCUMENTS 9,042,540 B2 * 5/2015 Tuchman ............ H04M 3/5166
379/265.09
9,830,044 B2 * 11/2017 Brown ................ G06F 3/04817
(Continued)

OTHER PUBLICATIONS

Turgman, "Extending Microsoft's Bot Framework with Graph-Based Dialogs", Microsoft Real Life Code, Nov. 11, 2016.
(Continued)

*Primary Examiner* — Linh K Pham
(74) *Attorney, Agent, or Firm* — Fletcher Yoder PC

(57) ABSTRACT

A conversation-based computing system may include a back-end computing module, a design module, and an execution module. The design module may be configured to provide a graphical user interface through which different conversation models are defined in metadata. Each model may include a topic containing respective goals, where the goals are associated with respective conversation flows that define respective dialogs that directs conversations toward the associated goals. Each model may also define references to topic-specific content stored in the back-end module. The execution module may be configured to execute a particular model between the system and a front-end computing device and set up integration of a live agent into the model. Execution of the model may involve, in part, carrying out, in an at least partially-automated fashion, the flow for the model according to the dialog, the topic-specific content corresponding to the model, and communicating using a specific communication protocol.

20 Claims, 18 Drawing Sheets

Related U.S. Application Data

(60) Provisional application No. 62/510,149, filed on May 23, 2017.

(51) Int. Cl.
*G06F 16/25* (2019.01)
*G06Q 10/10* (2012.01)
*G06Q 30/00* (2012.01)
*G06F 3/0482* (2013.01)
*G06F 17/27* (2006.01)

(52) U.S. Cl.
CPC ......... *G06F 17/2785* (2013.01); *G06Q 10/10* (2013.01); *G06Q 30/01* (2013.01); *G06Q 30/016* (2013.01)

(56) References Cited

U.S. PATENT DOCUMENTS

| | | | | |
|---|---|---|---|---|
| 2009/0222507 A1* | 9/2009 | Koseki | ................... | G06Q 10/00 709/202 |
| 2010/0324961 A1* | 12/2010 | Singh | ................... | G06Q 10/10 705/304 |
| 2011/0141919 A1* | 6/2011 | Singh | ................. | H04L 41/0681 370/252 |
| 2013/0174034 A1* | 7/2013 | Brown | ................... | G06F 3/048 715/708 |
| 2013/0273976 A1 | 10/2013 | Rao et al. | | |
| 2013/0283168 A1* | 10/2013 | Brown | ................... | G06F 3/165 715/728 |
| 2013/0346886 A1* | 12/2013 | Cauchois | ............. | H04L 51/046 715/758 |
| 2014/0244266 A1* | 8/2014 | Brown | ................... | G06F 9/453 704/275 |
| 2014/0270109 A1 | 9/2014 | Riahi et al. | | |
| 2014/0297268 A1 | 10/2014 | Govrin et al. | | |
| 2014/0317502 A1* | 10/2014 | Brown | ................... | G06F 9/453 715/706 |
| 2015/0186154 A1* | 7/2015 | Brown | ................ | G06F 3/04817 715/706 |
| 2016/0099892 A1* | 4/2016 | Palakovich | ............. | H04L 51/04 709/206 |
| 2016/0246885 A1 | 8/2016 | Aravamudhan et al. | | |
| 2017/0017501 A1* | 1/2017 | Quast | ...................... | G10L 15/22 |
| 2018/0007206 A1* | 1/2018 | Klein | ................... | H04M 3/5191 |
| 2018/0095612 A1* | 4/2018 | Rapp | .................. | G06F 3/04817 |
| 2018/0143989 A1* | 5/2018 | Nomula | ............ | G06F 17/30654 |

OTHER PUBLICATIONS

Office Action for Australian Patent Application No. 2017236021 dated Sep. 7, 2018; 5 pgs.

Canadian Office Action for Canadian Application No. 2980907 dated Aug. 3, 2018; 4 pgs.

\* cited by examiner

Conversation Editor

Edit Topic: Return or Replace Items

Persona [Technical]

Header Information

Alias — 418
[Return or Replace Items]

Name
[Not_What_I_Ordered]

Conversation Summary — 420
["Return or Replace Items"]

Keywords — 422
[not as described, not as expected, Item, not, Arrived damaged, Change my mind, Doesn't fit, Doesn't work or defective, Missing parts or pieces, Ordered by m]

CRM System

CRM System — 424
[Client]

Live Agent
☐ Live Agent Enabled
426

Systems and Actions

Name
[Name]

System
[ ]

Action
[ ]

[+]

Variables [24] Fields [18] Tasks [6]

Tasks

[Save & Close] [Cancel]

Conversation Editor — 428

Systems and Actions

Name: [Name]    System: [ ]    Action: [ ]    [+]    Cirrus

Variables [24]   Fields [18]   Tasks [6]

Tasks

[+ Add Task]

Show [10] Rows      [🔍 Search by Name]

| Title | Name | Type | Mode | | |
|---|---|---|---|---|---|
| Creating Ticket | CreateTicket | Consumer to system | Qmode | Edit | Delete |
| | Notification | System to consumer | Qmode | Edit | Delete |
| Check Status | CheckStatus | Consumer to system | Qmode | Edit | Delete |
| | Shipped | System to consumer | Qmode | Edit | Delete |
| Track My Order | TrackOrder | Consumer to system | Qmode | Edit | Delete |
| | ConfirmDelivery | System to consumer | Qmode | Edit | Delete |

Showing 1 to 6 of 6 entries      «Previous 1 Next»

[Save & Close] [Cancel]

FIG. 4E

TRANSACTIONAL CONVERSATION-BASED COMPUTING SYSTEM

CROSS-REFERENCE TO RELATED APPLICATIONS

This application is a continuation of and claims priority to U.S. patent application Ser. No. 15/717,787, filed Sep. 27, 2017, which is hereby incorporated by reference in its entirety. U.S. patent application Ser. No. 15/717,787 claims priority to U.S. Provisional Application No. 62/510,149, filed on May 23, 2017, which is also hereby incorporated by reference in its entirety.

BACKGROUND

Enterprise software systems may be used to implement operational processes for an enterprise, and may typically take the form of software applications. Such applications may be developed for usage by internal users (e.g., employees of the enterprise), as well as for external users such as customers that engage in transactions with the enterprise. Typically, enterprise systems use a desktop or web-based application having a forms-based user interface. In such an interface, a user might be presented with an electronic form in which the user fills out several fields or entries with data. However, with the advent of mobile technology, a form-based application can be cumbersome to use on mobile devices, and may sometimes request a user to provide irrelevant information. Further, electronic forms may be insufficient in collecting all the user's information, and thus the enterprise might not be able to meet the user's needs. Additionally or alternatively, in some scenarios, enterprise systems may use a voice call-based interface that enables a user to place a voice call to remote agents located in call centers or elsewhere. Again, with the advent of mobile technology, such a call-based interface may be time consuming and expensive to implement.

SUMMARY

The embodiments herein improve upon the enterprise systems discussed above and provide systems and corresponding methods for facilitating conversation-based interaction between users and an enterprise. Such a conversation-based approach may help the enterprise quickly and efficiently ascertain a user's objective and resolve the user's issue, perhaps without the user needing to navigate a complex website, complete a form, and/or make a call to a remote agent.

The conversation-based system may include a design module through which various conversation models may be defined. A conversation model may represent a transactional conversation between the enterprise's conversation-based system and a user's computing device, where the transaction conversation is tailored to meet the user's needs, the enterprise's needs, and/or the needs of another entity associated with the enterprise (e.g., if the enterprise's system is facilitating the other entity's processes). As such, a conversation model may have a topic, various respective goals (also referred to herein as "tasks") associated with that topic, and various conversation flows that direct the conversations towards those goals. Further, the conversation-based system may include a back-end computing module in which topic-specific content is stored and to which the conversation model may refer.

The transactional conversations that occur between the user and the enterprise may be partially automated or fully automated, and the system may be arranged to switch between partial and full automation. Partial automation may integrate into the conversation flow a remote live agent that may assist a user in reaching the user's goals. On the other hand, full automation may occur without human input on the enterprise side.

The conversation-based system may also include an execution module that facilitates execution of conversation models. To execute a given conversation model, the execution module may receive a subject from the user's device, match the subject to a conversation model topic, and execute a conversation flow that is determined by the conversation model topic. The execution of this flow may result in the implementation of a conversation between the system and the user.

The conversation-based system also includes various different protocol adapters that each uniquely connect with a user's device and support one or more messaging systems on the user's device. The protocol adapters may be used to carry out conversation flows with the user's device in accordance with a specific communication protocol that provides an adaptation of the conversation to different messaging systems. Further, to execute a given conversation module, the execution module may receive a subject from the user's device, match the subject to a conversation model topic, determine which communication protocol should be used for carrying out the conversation flows of the conversation model, and then carry out the conversation flows with the user's device.

Accordingly, a first example embodiment may take the form of a computing system for at least partially-automating transactional conversations between the computing system and at least one front-end computing device. The computing system may include a back-end computing module having stored topic-specific content. The computing system may also include a conversation design module configured to provide a graphical user interface through which a plurality of different conversation models are defined in metadata, where each conversation model includes a topic, the topics containing respective goals, and where the goals are associated with respective conversation flows that define respective dialogs that direct conversations toward the associated goals, and where each conversation model also defines references to the topic-specific content.

The computing system may also include a conversation execution module that includes (i) a plurality of protocol adapters, each configured for (a) connecting the conversation execution module with respective front-end computing devices based on characteristics of the respective front-end computing devices, and (b) carrying out respective conversation flows with the front-end computing devices according to specific communication protocols for each of the front-end computing devices, (ii) an application programming interface connector configured to connect the conversation execution module with the corresponding topic-specific content, and (iii) a conversation manager configured to (a) execute a particular conversation model between the computing system and a particular front-end computing device of the at least one front-end computing device, and (b) set up integration of a remote live agent into the particular conversation model.

Execution of the particular conversation model between the computing system and the particular front-end computing device may involve receiving, from the particular front-end computing device, a subject. Execution of the particular conversation model may also involve matching the subject to the topic of the particular conversation model. Execution of the particular conversation model may also involve determining a particular specific communication protocol from the specific communication protocols based on characteristics of the particular front-end computing device. And execution of the particular conversation model may also involve carrying out, in an at least partially-automated fashion, the conversation flow for the particular conversation model according to the dialog and the topic-specific content corresponding to the particular conversation model, where carrying out the conversation flow involves communicating with the particular front-end computing device according to the particular specific communication protocol.

Further, a second example embodiment may take the form of a computing system. The computing system may include a conversation design module configured to provide a graphical user interface through which a conversation model is defined in metadata, where the conversation model includes a topic, the topic containing a goal, and where the goal is associated with a conversation flow that defines a dialog that directs conversations toward the associated goal, and where the conversation model also defines references to topic-specific content stored in a back-end computing module. The computing system may also include a conversation execution module configured to execute the conversation model between the computing system and a front-end computing device. Execution of the conversation model may involve receiving, from the front-end computing device, a subject. Execution of the conversation model may also involve matching the subject to the topic. Execution of the conversation model may also involve determining a specific communication protocol based on characteristics of the front-end computing device. And execution of the conversation model may also involve carrying out, in an at least partially-automated fashion, the conversation flow according to the based dialog and the topic-specific content, where carrying out the conversation flow involves communicating with the front-end computing device according to the specific communication protocol.

A third example embodiment may involve a computing system receiving, via a graphical user interface through which a conversation model is defined in metadata, inputs defining (i) a topic of the conversation model, (ii) a goal associated with the topic, and (iii) one or more conversation prompts that make up a conversation flow of the conversation model, where the conversation flow defines a dialog that directs conversations toward the associated goal, and where the conversation model defines references to topic-specific content stored in a back-end computing module of the computing system. The third example embodiment may also involve the computing system generating the conversation model based on the received inputs. The third example embodiment may also involve the computing system executing the conversation model between the computing system and a front-end computing device. Execution of the conversation model may involve receiving, from the front-end computing device, a subject. Execution of the conversation model may also involve matching the subject to the topic. Execution of the conversation model may also involve determining a specific communication protocol based on characteristics of the front-end computing device. And execution of the conversation model may also involve carrying out, in an at least partially-automated fashion, the conversation flow according to the dialog and the topic-specific content, where carrying out the conversation flow involves communicating with the front-end computing device according to the specific communication protocol.

In a fourth example embodiment, an article of manufacture may include a non-transitory computer-readable medium, having stored thereon program instructions that, upon execution by a computing system, cause the computing system to perform operations in accordance with the first, second, and/or third example embodiment.

In a fifth example embodiment, a computing system may include at least one processor, as well as memory and program instructions. The program instructions may be stored in the memory, and upon execution by the at least one processor, cause the computing system to perform operations in accordance with the first, second, and/or third example embodiment.

In a sixth example embodiment, a system may include various means for carrying out each of the operations of the first, second, and/or third example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4C illustrates an example GUI of the conversation design module, in accordance with example embodiments.

FIG. 4D illustrates an example GUI of the conversation design module, in accordance with example embodiments.

FIG. 4E illustrates an example GUI of the conversation design module, in accordance with example embodiments.

DETAILED DESCRIPTION

Figure 1:
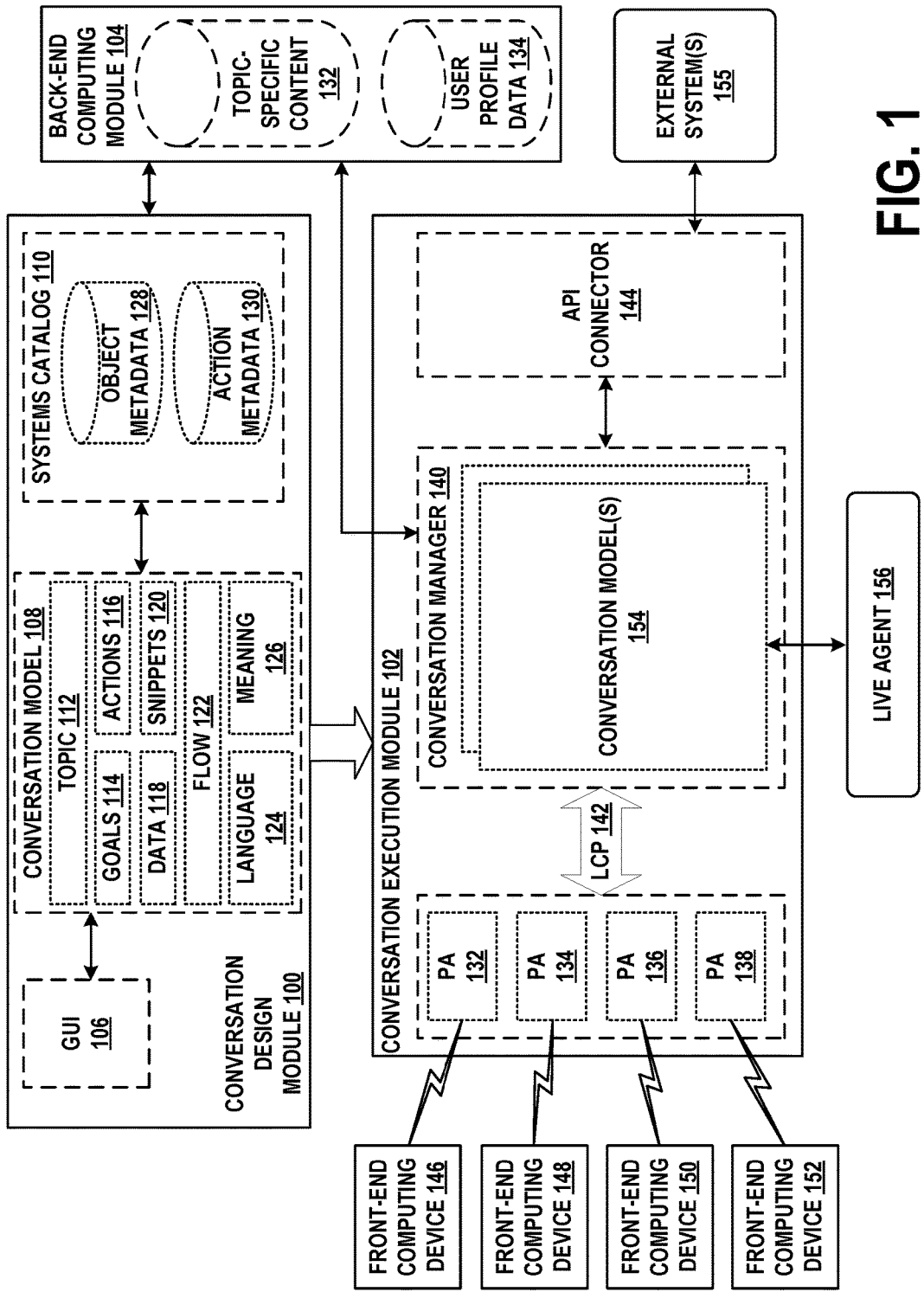
FIG. 1 illustrates a detailed system architecture diagram of a conversation-based system, as well as front-end computing devices with which the conversation-based systems may communicate, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

In line with the discussion above, a conversation-based system (also referred to herein as "the system") may be used to design and then implement a transactional conversation model (hereinafter "conversation model" or "model"). The conversation model may define a dialogue of one or more user interactions with the enterprise, and may provide a conversational interface that incorporates a conversation or series of conversations between the user and the enterprise to perform a requested service that is supported by the enterprise. For example, an airline may use the conversation-based system to implement a conversation model or models that enable users to request services such as purchasing airline tickets, filing a claim for lost luggage, changing an existing reservation, etc. A service can take various other forms as well, such as a request for troubleshooting information, a request to access confidential information, and a request to track an order for a product, among other possibilities. The dialogue of the conversation model may be transactional—meaning that it may involve one or more transactions between the user and the conversation-based system. Further, the dialogue may dynamically change based on user-responses to tailor the conversation to fit the user's request.

In some embodiments, an enterprise may operate the conversation-based system (e.g., design and roll out various conversation models) to provide the enterprise's services to users. However, in other embodiments, the enterprise may operate the conversation-based system on behalf of a client or other entity associate of the enterprise to provide that client or associate's services to users. Further, in other embodiments, the enterprise may operate the conversation-based system to provide to users both the enterprise's services and client/associate's services, either separately, or as an integration of both services. The client/associate themselves may also operate the conversation-based system, in some instances. In any event, for brevity's sake, the term "enterprise" may refer herein to an enterprise and/or a client of the enterprise. Furthermore, any individual (e.g., of the enterprise and/or client/associate of the enterprise) that operates the conversation-based system or any component thereof may be referred to herein as an "operator." For example, an operator may include a designer of a conversation model, a back-end database manager, or a tester of a conversation model. In this context, a remote live agent could be considered an operator, but will be referred to herein as a separate entity.

In some embodiments, the conversation model may be designed using a conversation model tool. The conversation model tool may enable an operator to define various aspects of conversations with users, such as a topic of conversation, various user-side and/or enterprise-side actions, and the conversation flow. The topic, for instance, may refer to the subject and definition of a conversation, such as what service is being requested and performed. For example, in the context of an airline, services such as reserving a flight, checking a flight status, tracking bags, etc., can be defined as topics. Further, for each topic, the conversation model tool may enable the operator to define the name of the topic, goals associated with the topic, the type of each goal (e.g., user to system, or system to user), and the mode of each goal (e.g., user to automated system and no live agent, or user to automated system and live agent).

The conversation model may include "snippets," each snippet representing an interaction between the conversation-based system and the user that occurs in the process of achieving a given goal or goals. In some embodiments, a snippet may take the form of a prompt that the conversation-based system provides to the user. In these embodiments, each prompt may depend on the response received from the user in response to another prompt. For example, a given prompt may be provided based on a single response received from the user in response to the prompt directly preceding the given prompt, or may be based on a consideration of a series of responses to multiple preceding sequential or non-sequential prompts. The conversation model tool may enable an operator to define each snippet of a conversation model.

In some embodiments, the conversation model may be tailored to one or more of the enterprise's operational processes. For example, the conversation model may understand specific language used by the enterprise (e.g., acronyms and terms) and language used by customers and employees. In particular, the conversation model may incorporate various linguistic elements such as keywords, phrases, and natural language processing to understand the user's input to the interaction. In some cases, the conversation model may be designed to understand user intent and behavior to better predict the user's objective and achieve the user's goal. Further, the conversation model may learn and adapt to various user requests over time by tracking the progress of user interactions, user behavior, and outcomes to better predict a user's objective and to more efficiently achieve the user's goal(s).

In some embodiments, the conversation model may be fully automated. In a fully-automated conversational model, one or more machines of the conversation-based system may intelligently engage in a transactional conversation with the user, and process all data and services involved in the conversation, without input from a live human on the enterprise side (e.g., an enterprise employee or third party). In other embodiments, the conversation model may be partially automated, in which the conversation may, in a multimodal fashion, seamlessly transition between automation software and user interaction with input a live human. For instance, depending on the user's responses to the conversation model, the conversation model may invoke the assistance of a remote live human agent (e.g., a customer service representative of the enterprise) to complete the goal or service.

Herein, a "live" agent may refer to a human agent, operating remotely from the user and the system, that provides real-time or non-real-time input to be integrated into the conversation. For example, such live agent support may involve an agent engaging in a live audio call with the user, or may involve the agent "taking over" the conversation and manually typing or dictating (e.g., using Speech-to-Text) conversation snippets that will appear as part of the conversation on the user's front-end computing device. Other examples are possible as well. Further, it should be noted that, in some scenarios, a "remote" agent might not be located remotely from the system, and may use a component of the system to provide assistance.

In some embodiments, the conversation-based system may be implemented on a user's device (e.g., a smart phone, laptop computer, desktop computer, tablet, smart glasses, an augmented reality device, a virtual reality device, etc.) and may be "portable"—namely, the system may be configured to tie the conversation model to multiple different front-end computing systems (e.g., different user devices). Phrased another way, the conversation model may be logical and might not depend on the physical device on which it executes. By having separation between the logical conversational model and its physical realization, the conversation model may achieve portability across many different front-end computing systems by providing a logical-to-physical mapping layer of software. Accordingly, the conversation-based system may be implemented on multiple different front-end computing systems having different operating environments. Further, the conversation based-system may operate on different platforms such as the enterprise's native application, a text messaging application, or a social media messaging application that executes on the front-end computing system.

The disclosed conversation-based system may include various graphical user interfaces (GUIs). For example, the conversation-based system may implement a GUI as part of a conversation model tool operating on a conversation design module of the system. Through this tool, various conversation models may be created for an enterprise, or perhaps for clients of the enterprise. As another example, the conversation-based system may implement on front-end computing systems various GUIs through which the user can experience various conversation models. Such GUIs may be provided on the enterprise's native application or on other applications that execute on front-end computing systems. In some embodiments, GUIs on different front-end computing systems may appear similar, so that the enterprise can maintain a similar style, look, and feel to the GUI used by its customers and employees. In other embodiments, the style, look, and feel to the GUI may vary from application to application, or from front-end system to front-end system.

The following embodiments describe architectural and functional aspects of example conversation-based computing systems, as well as the features and advantages thereof.

II. Example Computing Devices and Conversation-Based Computing Environments

FIG. 1 illustrates a detailed system architecture diagram of an example conversation-based system, as well as front-end computing devices with which the conversation-based system may communicate, in accordance with example embodiments described herein. As shown, the example conversation-based system includes a conversation design module 100 (hereinafter "design module"), a conversation execution module 102 (hereinafter "execution module"), and a back-end computing module 104. Each of these modules may be wirelessly connected and/or connected via a wired connection (e.g., Ethernet).

The design module 100 may include a GUI 106, a conversation model 108, and a systems catalog 110. The design module 100 may provide GUI 106 via a display device of the design module 100, such as a touch screen or computer monitor, and the operator may interact with GUI 106 via an input device such as a touch screen, keyboard, trackpad, and/or mouse. In some embodiments, GUI 106 may be provided as part of a conversation model tool that facilitate the creation and management of metadata in which conversation models are defined. Phrased another way, the operator may use GUI 106 and the conversation model tool to define some or all aspects of a conversation model described herein, such as topics, goals, etc.

Conversation model 108 is a representative example of a conversation model that an operator may design using the design module 100. In some embodiments, conversation model 108 may be stored either in local memory of the design module 100 (not shown) or in remote memory at another device, such as execution module 102 or back-end computing module 104. As shown, conversation model 108 includes a topic 112, goals 114, actions 116, data 118, snippets 120, flow 122, language 124, and meaning 126, each of which may be represented as metadata. In other embodiments, conversation model 108 may include other elements in addition to or alternatively to those shown in FIG. 1.

A topic such as topic 112 may refer to the subject and definition of a conversation, such as what service is being requested and performed, as noted above. A topic may represent one instantiation of the conversation model, and may be an umbrella under which various user interactions and conversations fall.

In some embodiments, each topic may contain respective goals, and thus topic 112 may contain goals 114. For example, a topic such as "Return My Order" may contain various goals, such as creating a ticket with the enterprise, scheduling a return shipment, and then ultimately tracking a refund. In turn, each goal may have a definition, a type, a mode, and instances (of both data and actions), among other possible elements. In some embodiments, the definition of the goal may be a high-level definition of the goal (e.g., "Return My Order").

Further, the type of the goal may specify whether the goal involves the conversation-based system receiving information from the user (e.g., "Consumer to System") and/or the user receiving information from the conversation-based system (e.g., "System to Consumer"). The mode of the goal may specify whether the goal, in whole or in part, supports user interaction with the system only in a fully-automated mode (i.e., no live agent integration), or supports live agent integration in a partially-automated mode. Further, for a goal involving the user receiving information from the conversation-based system, various notifications may appear on the user's device, such as notifications to resume the conversation.

The execution and completion of a goal may include any action instances or data instances that occur during completion of the goal. The actions of a conversation model (e.g., actions 116) may be any actions that the user and/or system performs as part of the conversation model. Such actions may be bound to object metadata 128 and/or action metadata 130 stored in systems catalog 110.

Objects (also referred to herein as "data objects") may be instances of data entities that participate in a given conversation. For example, in a conversation regarding flight information and/or luggage, data objects may include one or more specific flight reservations that are applicable to the user and/or luggage tag IDs of one or more bags that the user has checked for their flight. As another example, in a conversation regarding the return of ordered items, data objects may include the items of the order that are being returned. Object metadata 128 may thus refer to a metadata definition of the data entities. For example, object metadata for an account object may refer to the definition of the account data entity. Each account (e.g., Person X's account, Account #123) may thus be an instance of that account data entity. Further, action metadata 130 may refer to a metadata definition of actions that may be performed during a given conversation (e.g., scheduling a delivery, booking a flight, returning an item). For example, action metadata for a shipment action may refer to the definition of the shipment service.

Moreover, actions may be represented as tasks, services, events, or the goals themselves. Tasks may be actions that are performed internally within the conversation-based system (e.g., creating a ticket). Further, services may be a more general form of an action that is invoked on an external system. Still further, events may be actions that are asynchronously triggered and that may result in notifications to users (e.g., a notification to a user that an order is ready for pickup).

By way of example, actions for the goal of "Return My Order" may include a user creating a ticket, the system notifying the user that the ticket has been created, the user requesting a status and tracking update for the return, and the system providing a particular status and tracking update for the return. Other examples are possible as well. Furthermore, each action may have a type and a mode, such as the type and mode described above.

Data 118, as shown in FIG. 1, refers to data that may be used to configure or manage the actions 116 and instances that occur as part of conversation model 108. In some embodiments, such data may be data that the design module receives from back-end computing module 104 or any other enterprise system. For instance, data 118 may define references to topic-specific content 132 or user profile data 134 that is stored at back-end computing module 104. Topic-specific content relevant to conversation model 108 may then be integrated into conversation model 108 during execution based on those defined references.

Topic-specific content 132 may include enterprise content relating to a variety of conversation topics, and thus each conversation model may incorporate at least a portion of this content. For example, the topic-specific content for an airline company may include airline baggage allowance policies, airline flight times and schedules, delay information, customer service, etc., some or all of which may be relevant to a variety of topics, such as booking flights, changing flights, cancelling flights, finding lost luggage, and determining baggage policies, among other possibilities.

User profile data 134 may include data relating to a profile that the user has established with the enterprise. For example, user profile data for an airline company may include a user's account with the airline company, including accumulated miles, previous flights, the user's frequent flying number, etc. Further, user profile data 134 may include data related to the user's device (e.g., a front-end computing device). In particular, user profile data 134 may include device data and device characteristics/capabilities that the user has given permission for the enterprise to access, such as the device's mobile equipment identifier (MEID), device type (e.g., smartphone), a history of global positioning system (GPS) locations of the device, an identification of applications installed on the device, device settings, time entries for previous conversations, time entries for other user device actions, and/or device capabilities (e.g., camera, microphone, or other resources). Other examples are possible as well.

Examples of data 118 may include data objects and fields related to topic 112, and context data. As noted above, data objects may be instances of data entities that participate in a given conversation. In some embodiments, each topic 112 may include one or more fields, each of which may define information that is to be obtained from the user and/or provided by the system during the conversation. For instance, for returning an order, one field may be an item selection field where the user will select which product item to return. A field may have a type, such as a predefined list of items from which the user may select.

Further, context data may include, for example, a user/device GPS location, a user device type, a time or times a user has performed various actions, and/or a user profile with the enterprise, among other possibilities. In some embodiments, at least some of such context data may be the same as user profile data 134, and may be stored at the design module or imported from back-end computing module 104.

Snippets 120, in line with the discussion above, may represent interactions that are part of conversation model 108 and that occur between the conversation-based system and the user in the process of achieving a given goal or goals. One or more snippets may be associated with a potential user response to a preceding snippet. In some embodiments, a snippet may take the form of a prompt that the conversation-based system provides to the user, such as "Can you please select which item you want to return?" As described above, each prompt may depend on the response received from the user in response to another prompt. However, in some embodiments, each prompt might not depend on the response received from the user in response to another prompt, but may rather be selected in some other manner, such as in one of the manners discussed below.

Flow 122 represents a conversation flow for conversation model 108. In some embodiments, a conversation flow may define respective dialogs that direct conversations toward their associated goals (e.g., goals 114). Further, in some embodiments, flow 122 may support one or more types of dialogs, including, but not limited to: (i) rules-based dialogs, (ii) graph-based dialogs, and/or (iii) artificial intelligence driven (AI-driven) dialogs. In some embodiments herein, the term "rules-based" may refer to any dialog that is performed in accordance with a set of rules and may thus encompass both graph-based dialogs and AI-driven dialogs.

At a high level, rules-based dialogs may involve performing a particular dialog action in response to detecting a particular input. By way of example, the conversation model may be configured to look for a particular user input (e.g., a response to a prompt), and, in response to detecting the user input, the conversation model may responsively provide the user with a particular prompt or other information. As another example, the conversation model may be configured to look for particular terms or a particular type of sentence structure in the user's input, and, in response to detecting such terms or structure, the conversation model may responsively provide the user with a particular prompt or other information.

Graph-based dialogs may involve various paths (e.g., branches of a tree-based structure) that the conversation may follow to achieve a desired result (e.g., completion of a goal). In some embodiments, the conversation-based system may implement techniques such as heuristics to determine which path to follow in the conversation.

AI-driven dialogs may incorporate various AI-based technology and techniques, such as machine learning. In some embodiments, the conversation-based system may use machine learning to generate and/or carry out at least a portion of conversation model 108.

In some embodiments, rules-based, graph-based, and/or AI-driven conversation models may be configured to implement a variety of language processing elements and AI-related techniques to better adapt to users, maintain a history of user interactions and corresponding outcomes, learn user intent, behavior, and patterns, predict user actions, and thus improve conversation flow over time and more efficiently interact with users to accomplish goals. For example, the conversation model may implement language processing elements such as natural language processing, text mining, keyword recognition/analysis, phrase recognition/analysis, voice (e.g., the user's voice) recognition/analysis, sentence structure recognition/analysis, introspective data model management and analytics, and/or predictive analytics, among other elements. Collectively, such elements are shown in FIG. 1 as "Language 124." Furthermore, as another example, the conversation model may implement AI-related techniques such as sentiment analysis, semantics analysis, and/or intent analysis, among other possibilities. Collectively, such elements are shown in FIG. 1 as "Meaning 126." Other examples are possible as well.

Further, the conversation-based system may use any of the techniques described above to ascertain an understanding and meaning of specific language used by the enterprise (e.g., acronyms and terms associated with the enterprise) and by the user (e.g., shorthand) in conversations.

Referring back to FIG. 1, the execution module 102 may include four protocol adapters 132, 134, 136, and 138 (each abbreviated as "PA," as shown). In other embodiments, execution module 102 may include a different amount of protocol adapters. In addition, execution module 102 may include a conversation manager 140, a logical conversation protocol (LCP) 142 that interfaces between the protocol adapters to the conversation manager 140, and an application programming interface (API) connector 144.

Further, also shown in FIG. 1 are four representative front-end computing devices 146, 148, 150, and 152. In line with the discussion above, each front-end computing device may be a smart phone, laptop computer, desktop computer, tablet, smart glasses, or other type of device, that is configured to engage in wireless or wired communication with the conversation-based system over a network such as the Internet.

In some embodiments, each of the protocol adapters may be configured to connect execution module 102 with each of the front-end computing devices based on respective characteristics of the front-end computing devices. Such characteristics may include, by way of example, an operating environment of the front-end device, an operating system of the front-end device, one or more user interfaces of the front-end device, and/or one or more applications installed on the front-end device. Regarding applications, for instance, execution module 102 may include a protocol adapter configured for communication with front-end devices via a native application on the front-end device (e.g., native Apple® operating system application built with Swift®, or native Android™/Windows® Phone application built with C#), a web application (e.g., an application built in JavaScript, HTML5, and/or Cascading Style Sheets (CSS), and accessible via the web), and/or a hybrid application (i.e., an application installed similar to a native application, but that functions as a web application).

To facilitate connection of execution module 102 with each of the front-end computing devices, each protocol adapter may be uniquely configured to support communication (e.g., execution of the conversation model) with a front-end device having particular characteristics. In particular, upon execution of the conversation model, execution module 102 may determine certain characteristics of the front-end device with which the conversation will occur (e.g., which native or non-native messaging systems/applications the front-end device supports), and may set up a particular corresponding protocol adapter to carry out the conversation flow with the front-end device in accordance with a specific communication protocol supported by the protocol adapter and the front-end device. For example, such a specific communication protocol may be an application layer protocol such as Short Message Service (SMS), Facebook® Messenger, and Extensible Messaging and Presence Protocol (XMPP). In essence, each protocol adapter may be configured to adapt the conversation to various front-end devices. For instance, the conversation-based system may include a Facebook® Messenger protocol adapter for connecting to a Facebook® Messenger application and adapt the conversation flow to that application.

In a particular example, referring to FIG. 1, front-end device 146 may have installed the enterprise's native application, and PA 132 may be configured to carry out conversation flows on the enterprise's native application. Further, front-end device 148 may have installed a mobile web application (e.g., an application on an airline company's website), and PA 134 may be configured to carry out conversation flows on the web application. Still further, front-end device 150 may have installed a social media messaging application (e.g., Facebook® Messenger or Slack®), and PA 136 may be configured to carry out conversation flows on the social media messaging application. And still further, front-end device 152 may have installed a SMS application, and PA 138 may be configured to carry out conversation flows on the SMS application. Other examples are possible as well.

Furthermore, LCP 142 may take the form of a generic messaging protocol according to which conversation model(s) 154 could be carried out by default. In some embodiments, LCP 142 may be configured to convert (e.g., translate) more specific protocols, such as those discussed above with regard to the protocol adapters, to and from the generic messaging protocol.

In some embodiments, as shown, conversation manager 140 may have a direct or indirect connection with back-end computing module 104, and in turn, a connection with topic-specific content 132 and user profile data 134. As such, this arrangement may enable conversation manager 140 to leverage predefined triggers and actions in a corresponding conversation model and integrate the particular topic-specific content into the conversation model using the references defined in the conversation model.

In some embodiments, API connector 144 may include one API connector or multiple API connectors, each of which may be configured to connect execution module 102 with one or more external systems 155 so that API connector 144 may then access data from, and/or perform actions on, external system(s) 155. For example, in a scenario where the conversation flow involves retrieving flight information for a user's flight, execution module 102 may use API connector 144 to request and then receive the flight information from an external system associated with a travel technology company and/or airline. As another example, in a scenario where the conversation flow involves a request for weather information, execution module 102 may use API connector 144 to request and then receive the weather information from an external system associated with a weather company. Other examples are possible as well. Furthermore, in some embodiments, an API connector that is associated with particular topic-specific content may enable conversation manager 140 to leverage predefined triggers and actions in a corresponding conversation model and integrate the particular topic-relevant external content into the conversation model using the references defined in the conversation model.

In some embodiments, execution of a particular conversation model between the communication-based system and a front-end device may involve execution module 102 receiving a subject from the front-end device, which execution module 102 may then match to a corresponding topic, and thus to a corresponding conversation model. The subject may take the form of data representative of a user input related to the topic. For instance, if the user selects a "Return or Replace Items" command of an application running on the front-end device, the front-end device may transmit data representative of that command, and execution module 102 may then determine that the command corresponds to the topic of "Return or Replace Items" and thus select the conversation model corresponding to that topic. In particular, conversation manager 140 may search through conversation model(s) 154 for the conversation model corresponding to that topic.

Furthermore, execution of a particular conversation model may involve execution module 102 using characteristics of the front-end device as a basis for determining a particular specific communication protocol for use in communicating (e.g., carrying out the model's conversation flow) with the front-end device. For instance, execution module 102 may determine what kind of messaging protocols the front-end device supports, such as SMS or a social media messaging protocol, and select one of those protocols for use as the specific communication protocol according to which the system may communicate with the front-end device. To facilitate this, for example, execution module 102 may refer to a stored user-profile associated with the front-end device to determine which protocols the front-end device supports. Other examples are possible as well.

Execution of a particular conversation model may further involve execution module 102 carrying out, in an at least partially-automated fashion, the conversation flow for the particular conversation model according to a particular dialog (e.g., rules-based, graph-based, and/or AI-driven, depending on the conversation model) and also according to the topic-specific content corresponding to the particular conversation model.

As discussed above, execution module 102 may execute the conversation flow of the particular conversation model in a partially-automated fashion or a fully-automated fashion. To facilitate this, conversation manager 140 may be further configured to set up integration of a remote live agent 156 into the particular conversation model. Live agent 156 may then provide real-time or non-real-time input to be integrated into the conversation. For example, as noted above, live agent integration may involve live agent 156 engaging in a live audio call with the user, or may involve live agent 156 "taking over" the conversation and providing conversation snippets that will appear as part of the conversation on the front-end device.

In some embodiments, the particular conversation model may be designed to incorporate optional live agent integration, where the user is given an option at one or more times during the conversation to speak with or otherwise communicate with a live agent. As another example, the particular conversation model may be designed to incorporate mandatory live agent integration, where the user is required to communicate with a live agent in order to complete one or more goals. In some embodiments, the particular conversation model may define whether the live agent integration is optional or mandatory.

In some embodiments, once integration of live agent 156 is initially set up, execution module 102 may continue to facilitate ongoing integration of live agent 156 into the conversation. Further, to help live agent 156 best understand the user's issue and avoid providing duplicate prompts to which the user has already responded, execution module 102 may provide live agent 156 with a transcript or other data that indicates what has been discussed as part of the conversation thus far, including user responses and prompts that have already occurred. For instance, execution module 102 may transmit this data to a computing device of live agent 156. Additionally or alternatively, execution module 102 may provide a GUI through which live agent 156 may view the data. Other examples are possible as well.

The blocks represented in FIG. 1 are for purpose of example. The conversation-based system may include more or fewer components, and the operations of each component may vary.

Figure 2:
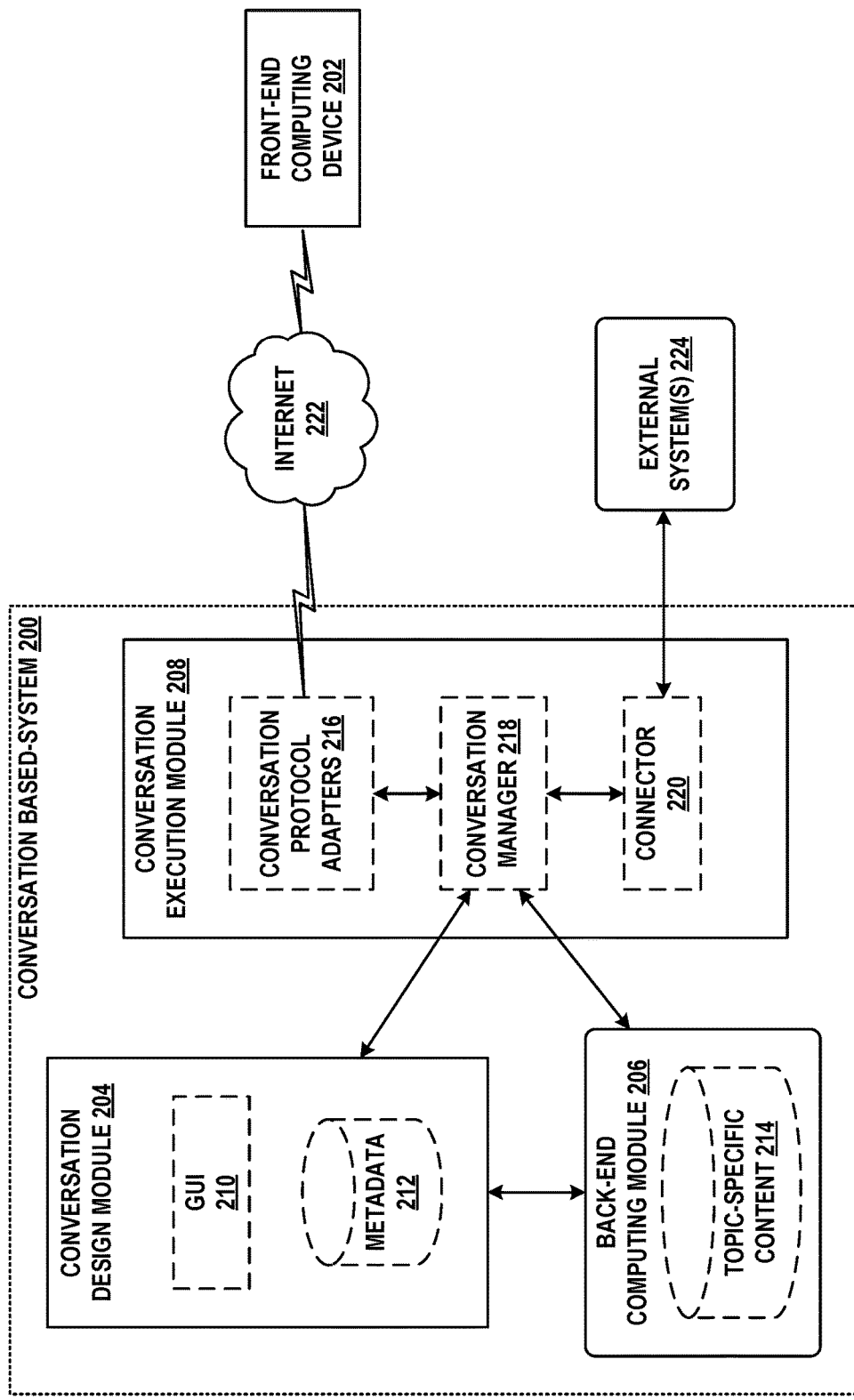
FIG. 2 illustrates a simplified system architecture diagram of the conversation-based system and a representative front-end computing device with which the conversation-based systems may communicate, in accordance with example embodiments.

FIG. 2 illustrates a simplified system architecture diagram of the conversation-based system 200 and a representative front-end computing device 202 (user device) with which the conversation-based system may communicate, in accordance with example embodiments described herein. As noted above, conversation-based system 200 may include a conversation design module 204, a back-end computing module 206, and a conversation execution module 208.

Conversation design module 204 may include a GUI 210 similar to the GUI discussed above, as well as metadata 212 in which one or more conversation models are defined.

Back-end computing system 206 may include topic-specific content 214, such as content specific to various services provided by the enterprise, to which various conversation models may define references.

Conversation execution module 208 may include conversation protocol adapters 216, a conversation manager 218, and a connector 220, each of which may be configured similarly to the protocol adapters, conversation manager, and API connector, described above with regard to FIG. 1. For instance, conversation execution module 208 may execute a conversation model between the conversation-based system 200 and the front-end computing device 202 over a network such as Internet 222 using protocol adapters 216, in accordance with a particular communication protocol, and on a variety of platforms on the front-end computing device 202.

As shown, Internet 222 may represent a portion of the global Internet. However, Internet 222 may alternatively represent a different type of network, such as a private wide-area or local-area packet-switched network.

In addition, connector 220 may have a connection with external system(s) 224. In line with the discussion with respect to FIG. 1, connector 220 may be configured to use this connection to access data from, and/or perform actions on, external system(s) 224.

Figure 3:
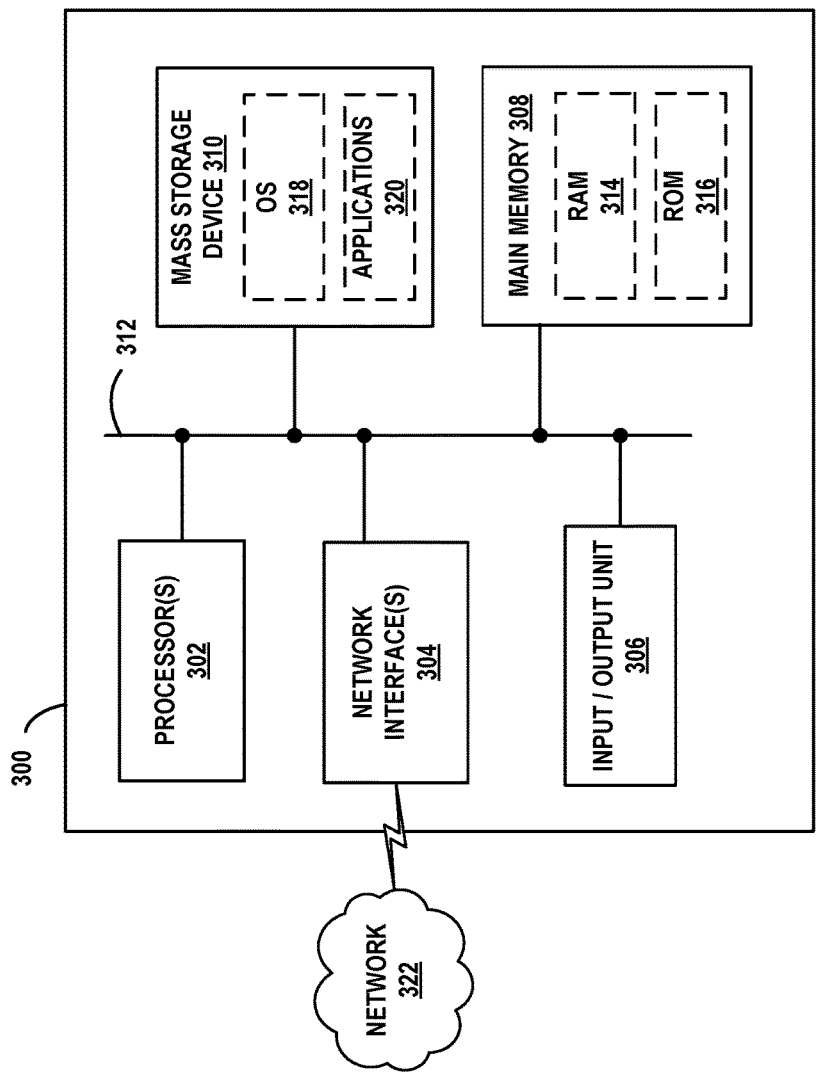
FIG. 3 illustrates an example block diagram of a computing device, in accordance with example embodiments.

FIG. 3 illustrates an example block diagram of a computing device 300, illustrating some of the components that could be included in a computing device arranged to operate in accordance with the embodiments herein. Computing device 300 could be a client device (e.g., a device actively operated by a user), a server device (e.g., a device that provides computational services to client devices), or some other type of computational platform. In particular, computing device 300 perform operations of a component of the conversation-based system described herein, such as the back-end computing module, the design module, and/or the execution module.

In this example, computing device 300 includes processor(s) 302 (referred to as "processor 302" for sake of simplicity), network interface(s) 304, an input/output unit 306, main memory 308, and a mass storage device 310, all of which may be coupled by a system bus 312 or a similar mechanism. In some embodiments, computing device 300 may include other components and/or peripheral devices (e.g., detachable storage, printers, and so on).

Processor 302 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be a single-core processor, and in other cases, processor 302 may be a multi-core processor with multiple independent processing units. Processor 302 may also include register memory for temporarily storing instructions being executed and related data, as well as cache memory for temporarily storing recently-used instructions and data.

Network interface(s) 304 may take the form of a wireline interface, such as Ethernet (e.g., Fast Ethernet, Gigabit Ethernet, and so on). Network interface(s) 304 may also support communication over non-Ethernet media, such as coaxial cables or power lines, or over wide-area media, such as Synchronous Optical Networking (SONET) or digital subscriber line (DSL) technologies. Network interface(s) 304 may also take the form of a wireless interface, such as IEEE 802.11 (Wi-fi), BLUETOOTH®, global positioning system (GPS), or a wide-area wireless interface. However, other forms of physical layer interfaces and other types of standard or proprietary communication protocols may be used over network interface(s) 304. Furthermore, network interface(s) 304 may comprise multiple physical interfaces. For instance, some embodiments of computing device 100 may include Ethernet, BLUETOOTH®, and Wi-fi interfaces.

Input/output unit 306 may facilitate user and peripheral device interaction with example computing device 300. Input/output unit 306 may include one or more types of input devices, such as a keyboard, a mouse, a touch GUI, and so on. Similarly, input/output unit 306 may include one or more types of output devices, such as a GUI, monitor, printer, and/or one or more light emitting diodes (LEDs). Additionally or alternatively, computing device 300 may communicate with other devices using a universal serial bus (USB) or high-definition multimedia interface (HDMI) port interface, for example.

Main memory 308 may be any form of computer-usable memory, including but not limited to register memory and cache memory (which may be incorporated into processor 302), as well as random access memory (RAM) 314 and read-only memory (ROM) 316. Other types of memory may include biological memory. Memory such as ROM 316 may contain basic routines to help transfer information between elements of the computing device 300.

Main memory 308 may store program instructions and/or data on which program instructions may operate. By way of example, main memory 308 may store these program instructions on a non-transitory, computer-readable medium, such that the instructions are executable by processor 302 to carry out any of the methods, processes, or operations disclosed in this specification or the accompanying drawings.

Mass storage device 310 may take the form of or contain a file system in which an operating system 318 (represented in FIG. 3 as "OS"), applications 320, and associated data, are stored. The operating system 318 may include modules for memory management, scheduling and management of processes, input/output, communication, and/or otherwise controlling the operation of the computing device 300. Applications 320 may be one or more user-space software programs, such as web browsers or email clients, as well as any software libraries used by these programs. Further, operating system 318 may include device drivers that enable the operating system 318 to communicate with the hardware modules (e.g., memory units, networking interfaces, ports, and busses), of computing device 300.

Although illustrated as separate components, in practice, main memory 308 and mass storage device 310 may be combined into a single component in some embodiments.

In some embodiments, the computing device 300 may operate in a networked environment using the network interface(s) 304 to connect to remote network devices through a network, such as wireless network 322, the Internet, or another type of network. The network interface(s) 304 may be used to connected to other types of networks and remote computing systems as well.

III. Example Conversation-Based GUIs

Example GUIs will now be described in the context of example services provided by an example enterprise. Alternatively, in line with the discussion above, the example services described herein may be services provided by a client or other associate of an enterprise, in which case the enterprise may use the conversation-based system to facilitate provisioning of these services using the conversation-based system.

In particular, FIGS. 4A, 4B, 4C, 4D, 4E, 4F, and 4G, each relate to services that could be provided by an online store or similar enterprise. Further, each of these figures provides an example GUI of the design module through which a conversation model can be defined.

Figure 4A:
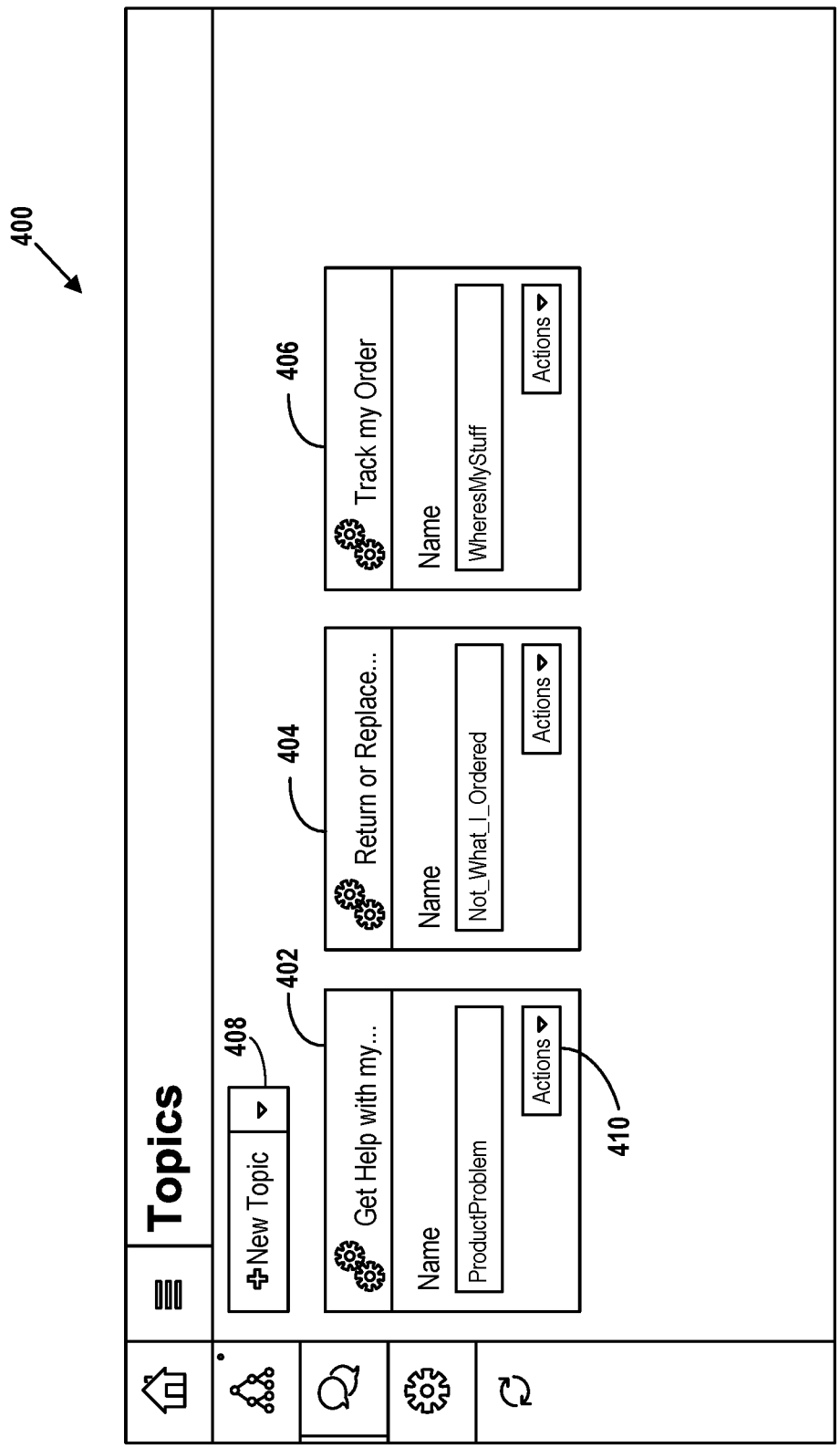
FIG. 4A illustrates an example GUI of a conversation design module, in accordance with example embodiments.

FIG. 4A illustrates an example GUI 400 that the design module may provide for creating or editing topics of various conversation models. As discussed above, GUI 400 may be provided as part of a conversation model tool. In practice, an operator may access GUI 400 to add a new topic, edit an existing topic, or delete an existing topic. The three conversation model topics shown in FIG. 4A relate to an online store, and include: "Get help with my product," "Return or Replace Items," and "Track My Order." Each of these three topics may have an associated GUI element, such as elements 402, 404, and 406, respectively. In addition, GUI 400 may include a "New Topic" element 408 that the operator can select to add a new topic. Further, each topic may include an "Actions" drop-down menu element 410 that, when selected, causes a drop-down menu to appear.

Figure 4B:
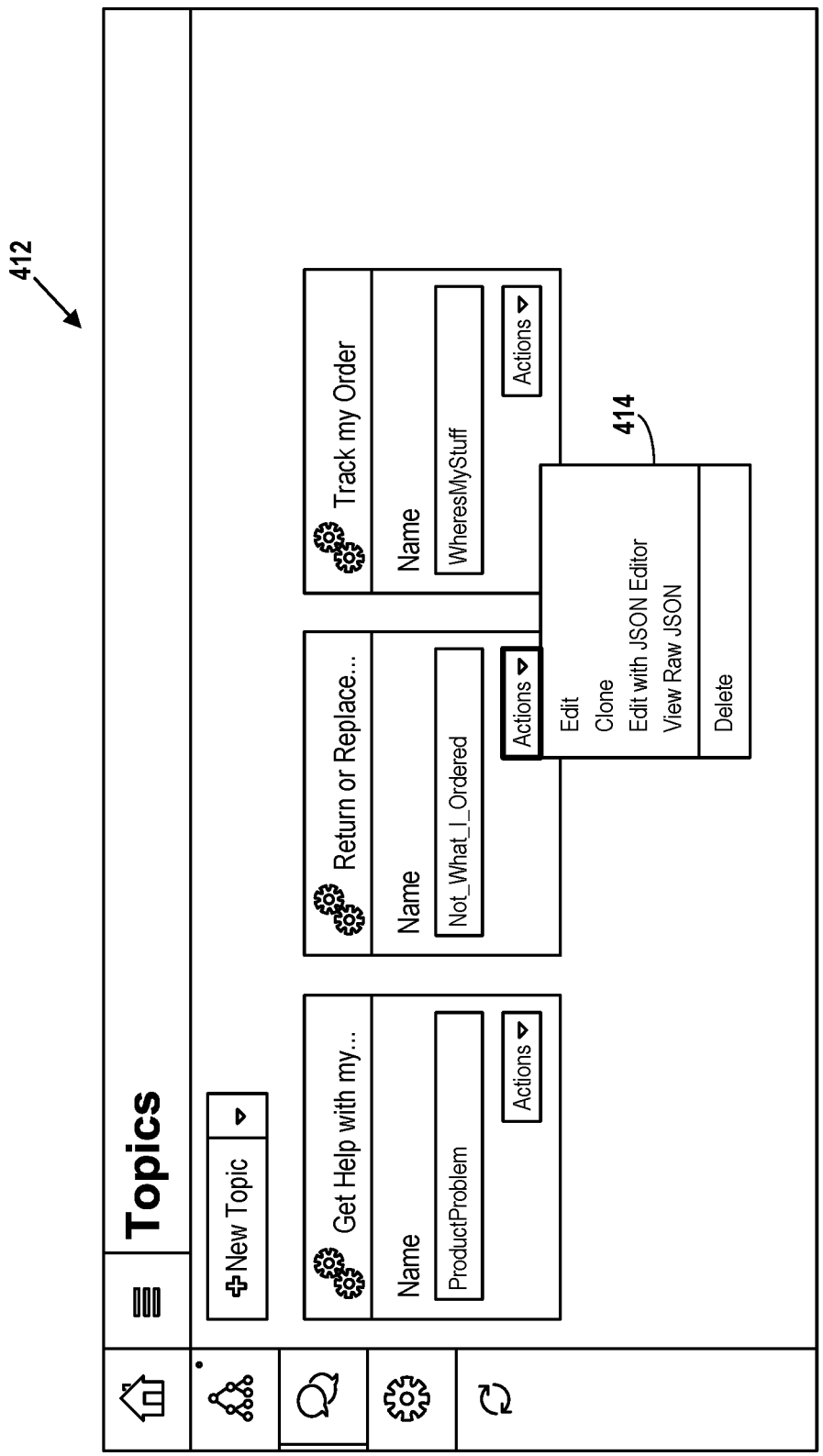
FIG. 4B illustrates an example GUI of the conversation design module, in accordance with example embodiments.

FIG. 4B illustrates an example GUI 412 including an "Actions" drop-down menu 414 for the "Return or Replace Items" topic. In some embodiments, the design module may enable an operator to modify or create a topic using JavaScript Object Notation (JSON), and such options may be included in the drop-down menu 414, among other options. For instance, as shown, the drop-down menu includes options such as "Edit," "Clone," "Edit With JSON Editor," "View Raw JSON," and "Delete."

FIG. 4C illustrates an example GUI 416 for editing a conversation model. In particular, GUI 416 may be displayed in response to selecting the option to edit the "Return or Replace Items" topic illustrated in FIG. 4B, which may define a conversation that the conversation-based system may have with a user for returning or replacing a purchased item.

In this example, the operator may use GUI 416 to provide various topic information, such as the topic name (e.g., the "Alias" element 418) and the topic description (e.g., the "Conversation Summary" element 420). Further, in the "Keywords" element 422, the operator may provide keywords associated with the topic, namely, keywords that indicate to the system that the user is seeking to return or replace an item. Still further, GUI 416 may include an element that can be used to select a customer relationship management (CRM) system includes (e.g., the "CRM System" element 424) to use for the topic. A CRM system may be a system through which the enterprise (or client of the enterprise) can compile and manage data related to its customers to better understand customer requests and goals. Further, GUI 416 may include an element for selecting whether to enable live agent integration into the conversation model (e.g., the "Live Agent" element 426).

In addition, as shown, GUI 416 may provide the name of one or more external systems that participate in the conversation, and may identify various actions that are provided by that system (e.g., a flight company back-end system that provides flight information, where retrieving a reservation and updating a reservation might be two actions provided by that system).

FIG. 4D illustrates an example GUI 428 for adding, editing, and/or deleting goals (i.e., "Tasks," as shown) of the conversation model—namely, for the "Track My Order" topic. As shown, GUI 428 includes three columns relating to the goals: "Title," "Name," "Type," and "Mode." In FIG. 4D, the "Title" of the goal may represent a high-level definition of the goal. Further, the "Name" of the goal identifies each action of the goal, and the "Type" of the goal may specify whether the action is an action where the conversation-based system receives information from the user (e.g., "Consumer to System") or an action where the user receives information from the conversation-based system (e.g., "System to Consumer"). It should be noted that GUI 428 identifies each action as a respective goal, thereby totaling six goals. Still further, the "Mode" column specifies whether each action of the goal will support user interaction with the system only in a fully-automated mode (i.e., no live agent integration), or will support live agent integration in a partially-automated mode. As shown, each goal is associated with a mode entitled "Qmode," which may be an example type of mode incorporating a prompt-based, question and answer interaction, where a user's answer to a given prompt may determine one or more subsequent prompts. Other types of modes are possible as well. For instance, another mode may incorporate a voice-based interaction, and yet another mode may incorporate a conversation interaction template according to which the conversation may occur.

By way of example, as shown in GUI 428, the goal of "Create Ticket" has two actions: (i) "CreateTicket," a "Consumer to System" action where the user creates a ticket with the system to track the user's order, and (ii) "Notification," a "System to Consumer" action where the system sends the user a notification related to creation of the ticket. Next, the goal of "Check Status" has two actions: (i) "CheckStatus," a "Consumer to System" action where a user requests that the system provide a status of the user's order, and (ii) "Shipped," a "System to Consumer" action, where the system informs the user that the order's status is that it has been shipped. Lastly, the goal of "Track My Order" has two actions as well: (i) "TrackOrder," a "Consumer to System" action where the user requests the system to provide tracking information for the user's order, and (ii) "ConfirmDelivery," a "System to Consumer" action where the system sends the user a tracking update that the order has been delivered. Other examples are possible as well.

Each goal may include additional or alternative actions in practice. For instance, "Check Status" may include an action where the order's status is that the order is still being processed and has not yet shipped (e.g., "In Processing," rather than "Shipped"), and "Track My Order" may include an action where the system sends the user a tracking update that the order is en route, perhaps specifying an exact location.

Figure 4E:
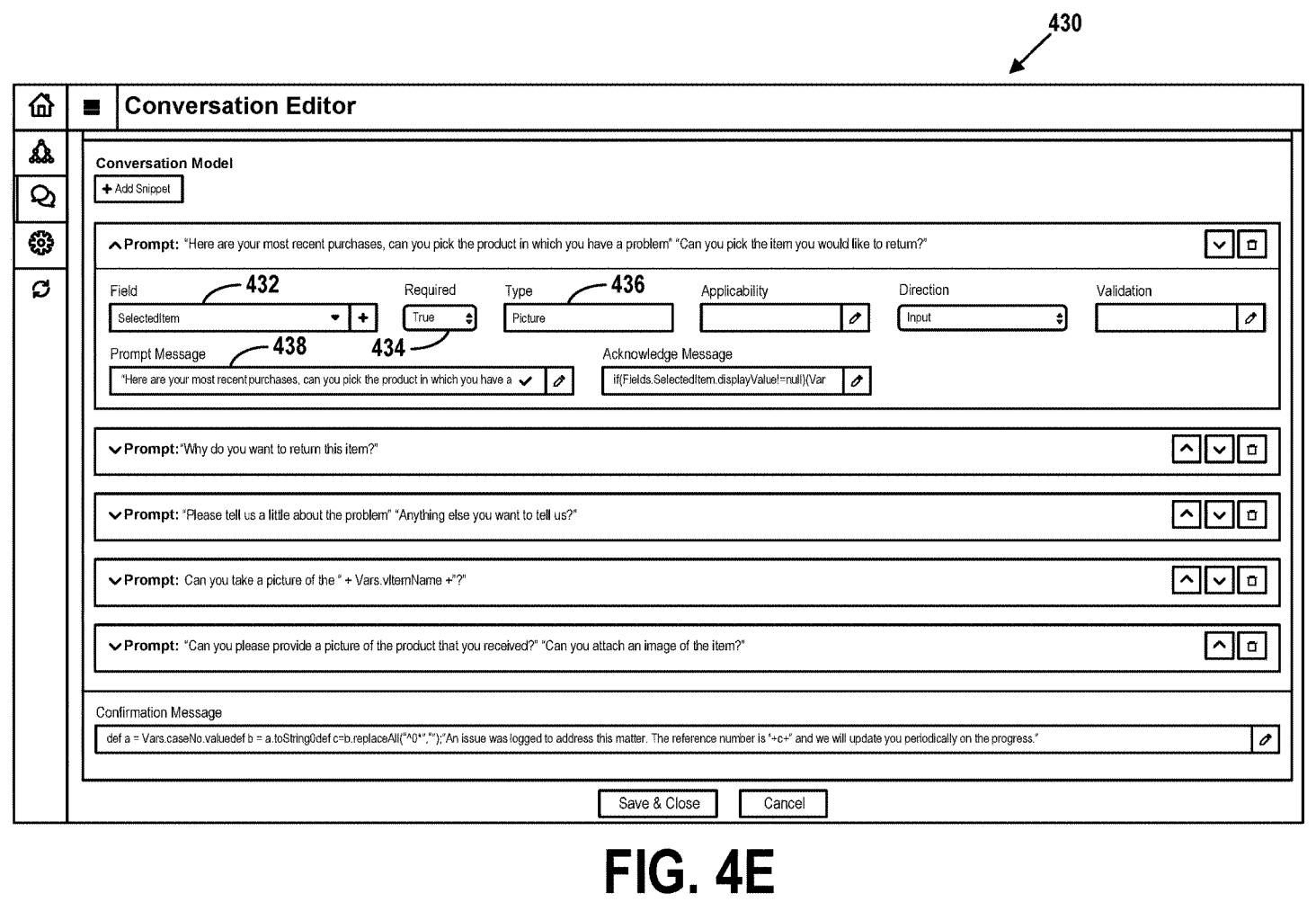

FIG. 4E illustrates an example GUI 430 for editing or adding one or more snippets associated with a goal. As shown, GUI 430 includes five prompts, each of which ask the user to provide information regarding the item to be returned, such as "Why do you want to return this item?" and "Can you take a picture of the "+Vars.vItemName+"?"

GUI 430 may enable the operator to provide a variety of metadata relating to each prompt. For example, the prompt for "Here are your most recent purchases, can you pick the product in which you have a problem"/"Can you pick the item you would like to return?" includes a "Field" element 432 that defines information to be obtained from the user with regard to the given prompt—namely, that the user will have to identify which product they have a problem with or would like to return (i.e., "SelectedItem," as shown). Further, this prompt includes a "Required" element 434, with which the operator can specify whether the user will be required to identify the product, and a "Type" element 436, with which the operator can specify the manner in which the user will be required to identify the product (e.g., by taking a "Picture" of the product, as shown). Still further, this prompt includes a "Prompt Message" element 438 where the operator can type what the prompt will ask. Other GUI elements are possible as well.

Figure 4F:
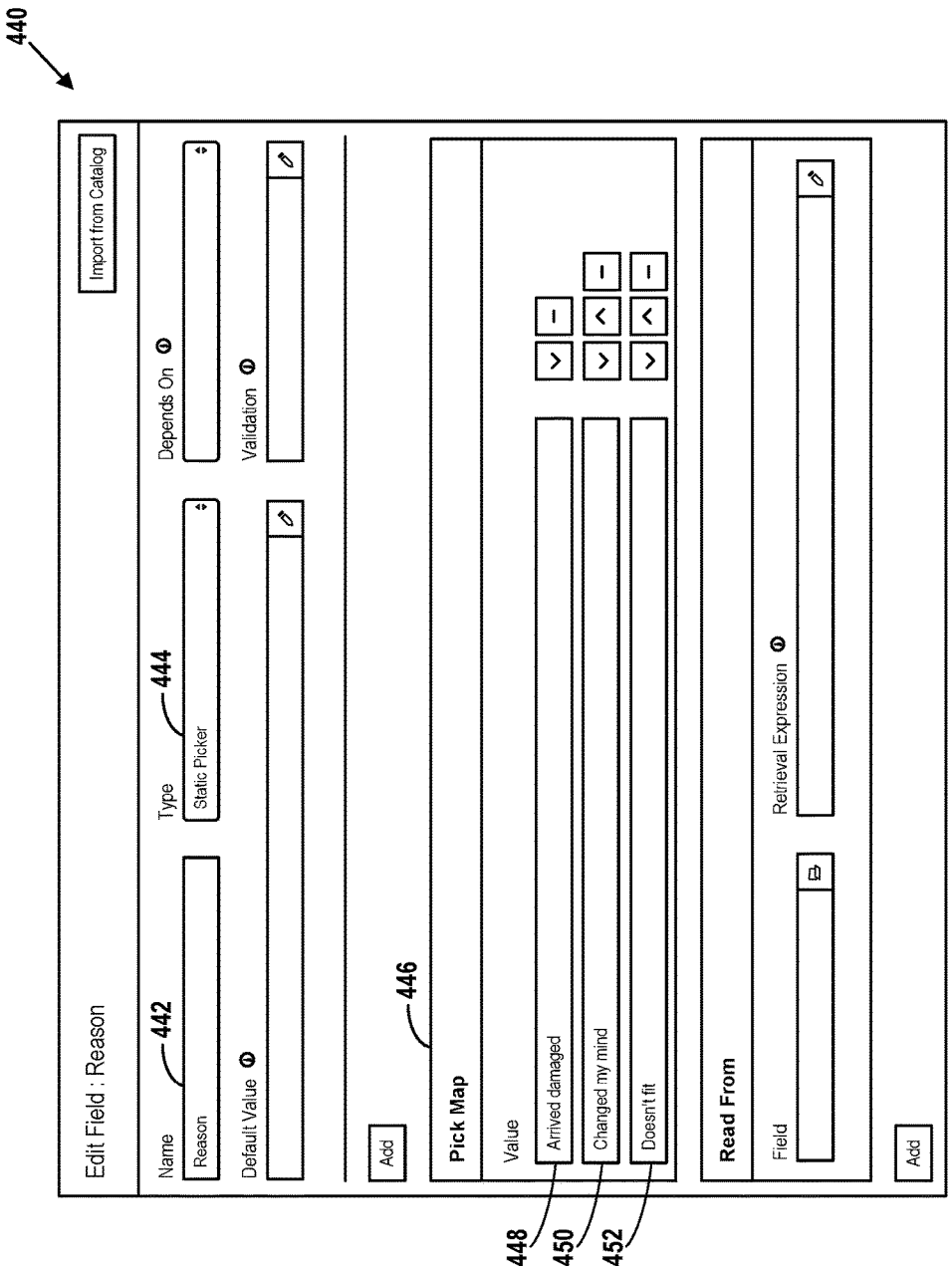
FIG. 4F illustrates an example GUI of the conversation design module, in accordance with example embodiments.

FIG. 4F illustrates an example GUI 440 for editing or adding a field associated with a topic. In particular, GUI 440 illustrates a "Reason" field that relates to a user-selection of a reason for why the user seeks to return or replace an ordered product. The field is named in the "Name" element 442 of the GUI 440. Further, GUI 440 includes a "Type" element 444 that indicates that the "Reason" field is a "Static Picker" type—namely, a predefined list of items from which the user may select. As such, GUI 440 also includes a "Pick Map" section 446 with three "Value" elements 448, 450, and 452, where the operator can define what the "Reason" list of selectable items comprises, such as "Arrived damaged," "Changed my mind," and "Doesn't fit."

Figure 4G:
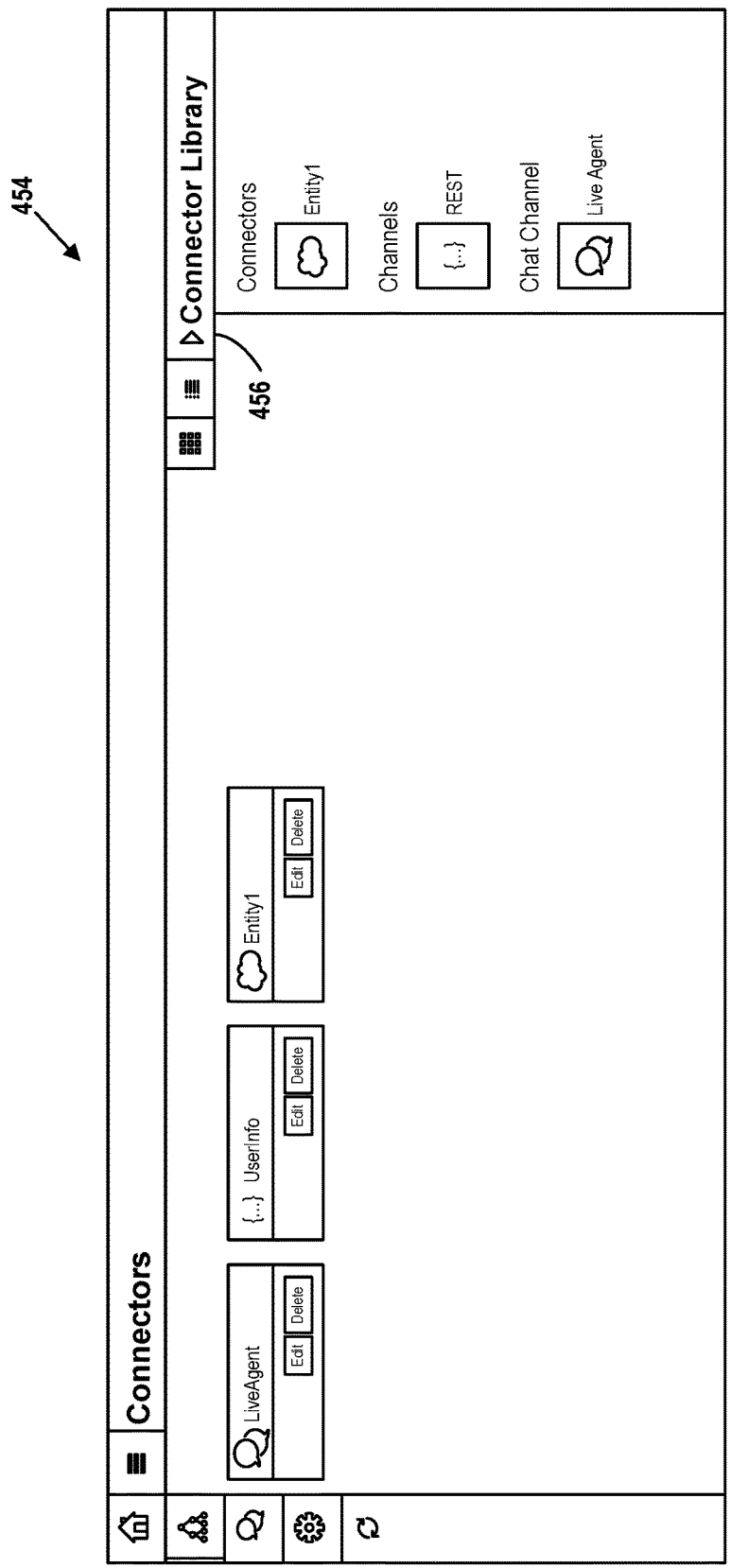
FIG. 4G illustrates an example GUI of the conversation design module, in accordance with example embodiments.

FIG. 4G illustrates an example GUI 454 for managing integration of the conversation model with the back-end computing module. In line with the discussion above, the back-end computing module may include data related to a live agent chatting system ("LiveAgent," as shown), a user-specific profile or information relating to the user (e.g., the user's account with the enterprise) or the user's front-end computing system ("UserInfo," as shown), or topic-specific content of a particular entity ("Entity1," as shown) or entities, such as the enterprise and/or one or more clients of the enterprise. Accordingly, at a high level, GUI 454 or a similar GUI may enable the operator to manage how the execution module integrates this data with the design and execution of the conversation model. For instance, as shown, GUI 454 includes a "Connector Library" section 456 listing API connectors and channels associated with topic-specific content for Entity 1, the live agent SMS chatting system, and user profile/device information. Furthermore, although not shown in GUI 454, the operator may use a GUI related to GUI 454 to import data, such as particular entity's topic-specific content, from the back-end computing module into the conversation model based on the references to such data that are defined in the conversation model.

FIGS. 5A, 5B, 5C, 5D, 5E, and 5F, illustrate various GUIs of a mobile application running on a user's front-end computing device. In particular, these figures illustrate an example scenario in which the user converses with an airline company via a conversation model implemented on the airline's mobile application. One or more conversations that these figures illustrate may relate to one or more topics, goals, actions, fields, etc., that an operator may define using the design module in the manner discussed above. Further, it should be noted that although the GUIs illustrated by these figures resemble an instant messaging or SMS application, conversations such as those shown in the figures are primarily between a user/client device and a computing system—namely, the conversation-based system.

In line with the discussion above, an enterprise may typically provide various mechanisms for customers or other users to engage in transactions with the enterprise. Such mechanisms may include web-based interfaces, telephone calls with customer service representatives, and/or instant messaging systems with a live representative, among other possibilities. However, there may be disadvantages to each of these mechanisms. For example, web-based interfaces may be awkwardly arranged and outdated, and/or may contain large electronic forms requesting user input of irrelevant information. These forms may present difficulties to users of smaller devices, such as smartphones and tablets. As another example, a telephone call or instant messaging system may be unproductive and inefficient if representatives are required to be available to assist users at all times, even with simple requests, or if representatives are unavailable for certain days and times.

The present disclosure thus provides a user-friendly mechanism—namely, the conversation-based computing system—for engaging in transactions with an enterprise. The conversation-based system may, for instance, provide a more efficient, user-friendly way to obtain information from a user and help reach a user's goal, without tying up unnecessary resources. Further, the ability of this system to be flexibly configured and customized to carry out particular conversations facilitates rapid deployment of sophisticated conversational capabilities. Consequently, the embodiments herein are technical tools that enable transactions to be performed according to a predefined set of customizable rules.

The figures described below illustrate examples of these and other improvements and advantages provided by the conversation-based system.

Figure 5A:
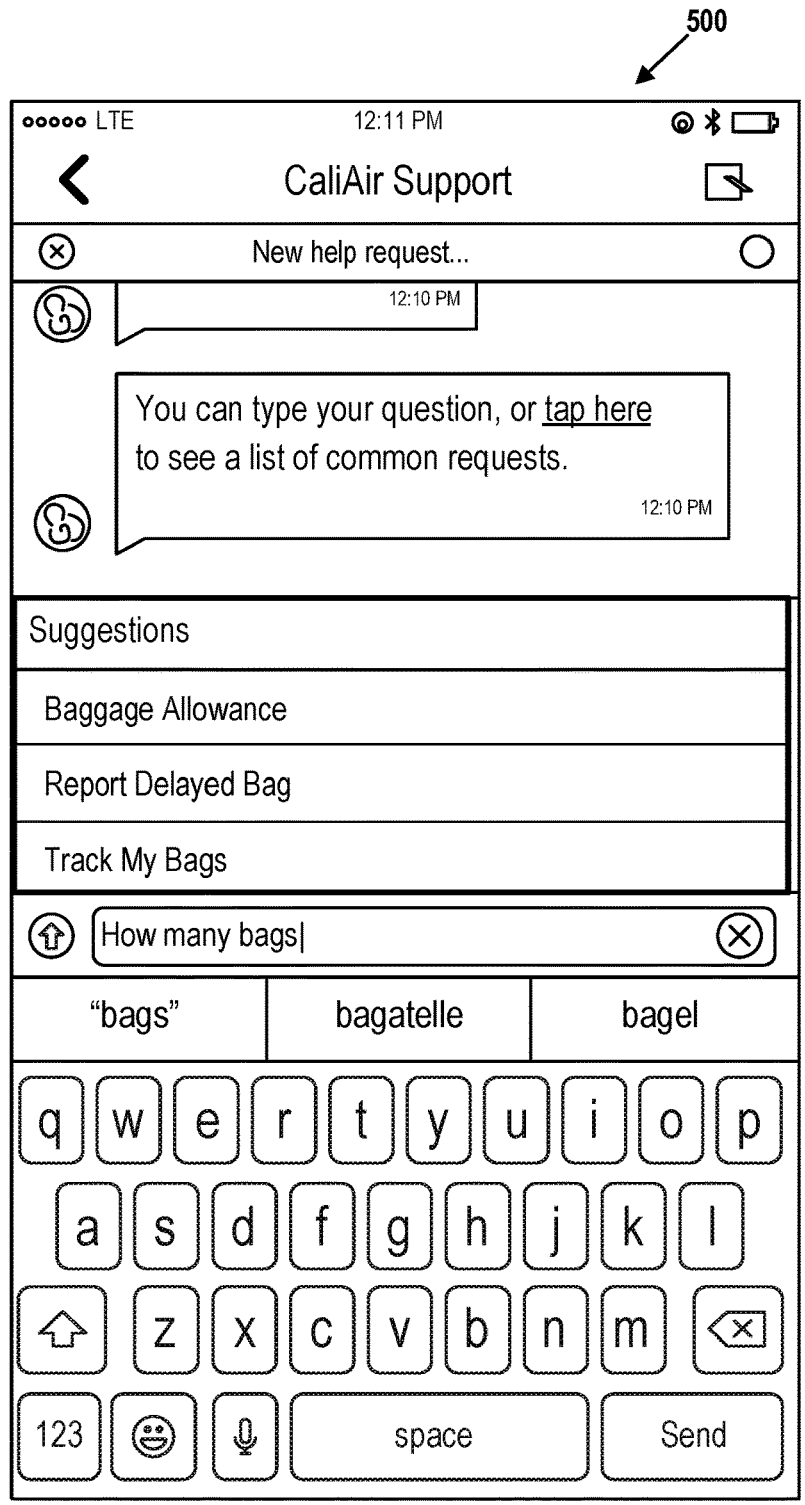
FIG. 5A illustrates an example GUI of a front-end computing system for interacting with the conversation-based system, in accordance with example embodiments.

FIG. 5A illustrates an example GUI 500 that enables a user to input a request into the application. As shown, the user types a question regarding how many bags the user is able to check, and various suggestions are auto-populated as the user types. Each of the suggestions shown—"Baggage Allowance," "Report Delayed Bag," and "Track My Bags"—may correspond to a particular topic and, in turn, to a particular conversation model designed at the design module. Although not shown, if the user then selects "Baggage Allowance," for instance, a GUI may appear that displays information regarding the airline's baggage allowance policy, such as text for various rules, a number of allowed bags, and a corresponding size of each bag that is allowed.

Figure 5B:
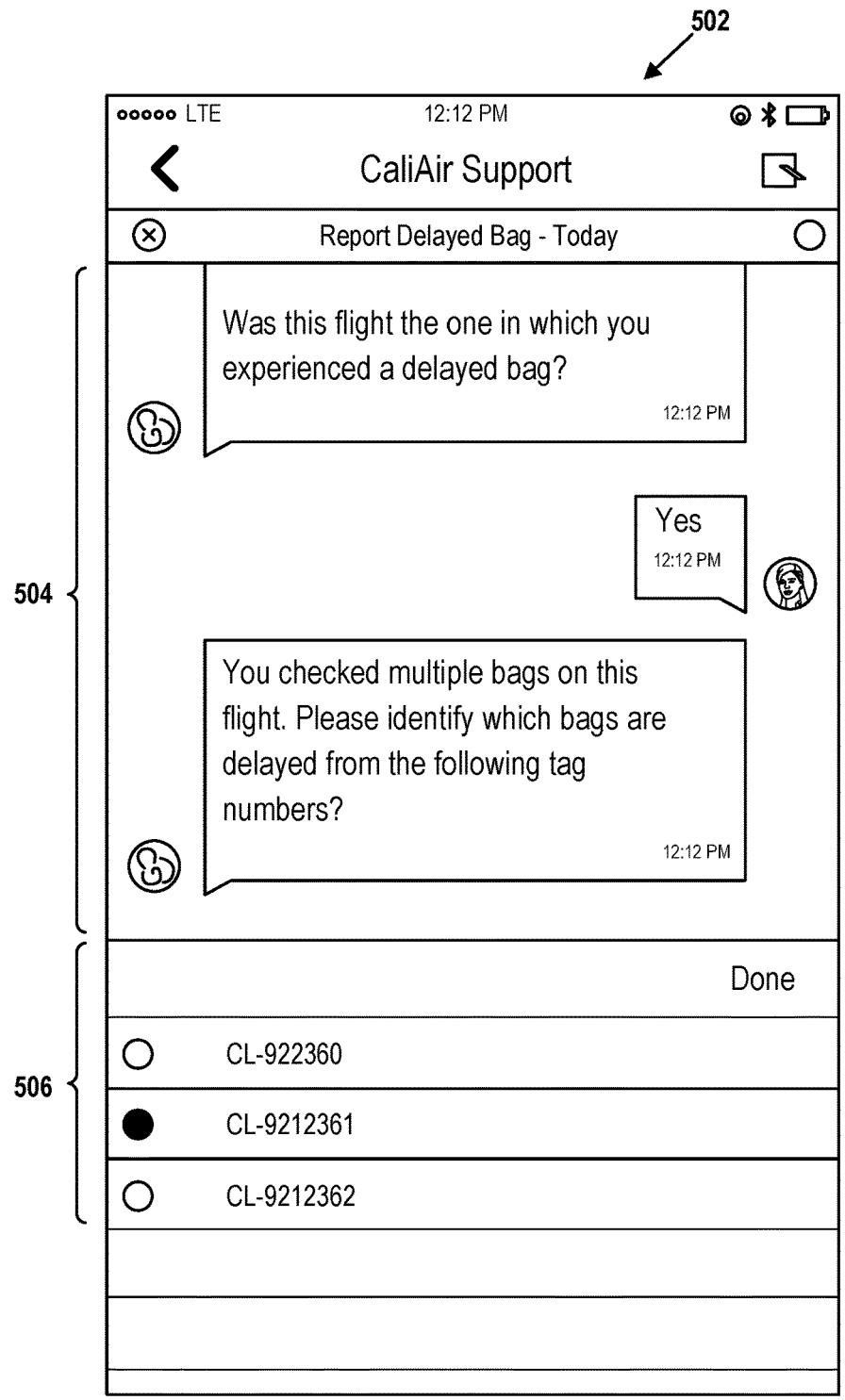
FIG. 5B illustrates an example GUI of the front-end computing system for interacting with the conversation-based system, in accordance with example embodiments.

FIG. 5B illustrates an example GUI 502 that may be displayed at some point after the user selects "Report Delayed Bag." In particular, GUI 502 comprises at least two sections: a messaging section 504 and a selection section 506. The messaging section 504 displays the conversation that occurs between the user and the system. The selection section 506 displays an interface including selectable options. In this example, the three selectable options shown each correspond to a different bag the user checked. Accordingly, the application enables the user to easily select a bag tag number corresponding to the delayed bag. To facilitate this, an operator may use the design module to define the conversation in the messaging section 504 as well as the selectable options displayed in the selection section 506. Further, the application may interface with the airline company via the conversation-based system to import relevant user information for use in the conversation, such as the user's flight information and bag tag information. Such information may be stored in the back-end computing module or elsewhere.

Figure 5C:
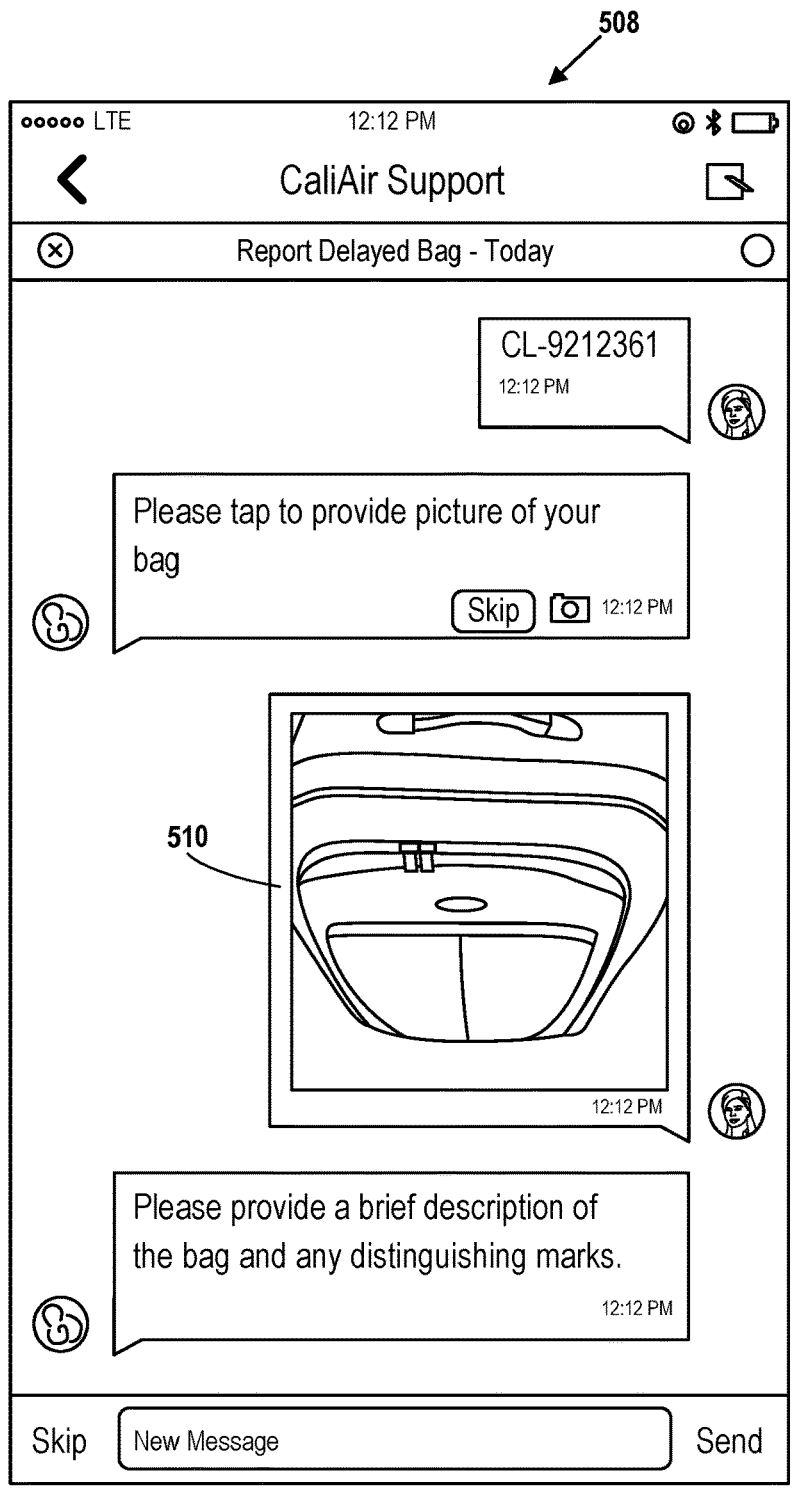
FIG. 5C illustrates an example GUI of the front-end computing system for interacting with the conversation-based system, in accordance with example embodiments.

FIG. 5C illustrates an example GUI 508 that may be displayed after a user has uploaded an image of their bag 510 in response to being prompted with the instruction "Please tap to provide picture of your bag." In practice, such an image may be helpful so that a record of the bag tag and the corresponding image of the bag can be added to a record of the user's claim. As discussed above, each user response may affect the subsequent prompt in a repeated process until the goal is complete, and perhaps thereafter. For instance, as shown, the conversation model may be defined such that, in response to the user uploading a picture of the user's delayed bag, conversation model may ask the user to provide a brief description of the bag.

Figure 5D:
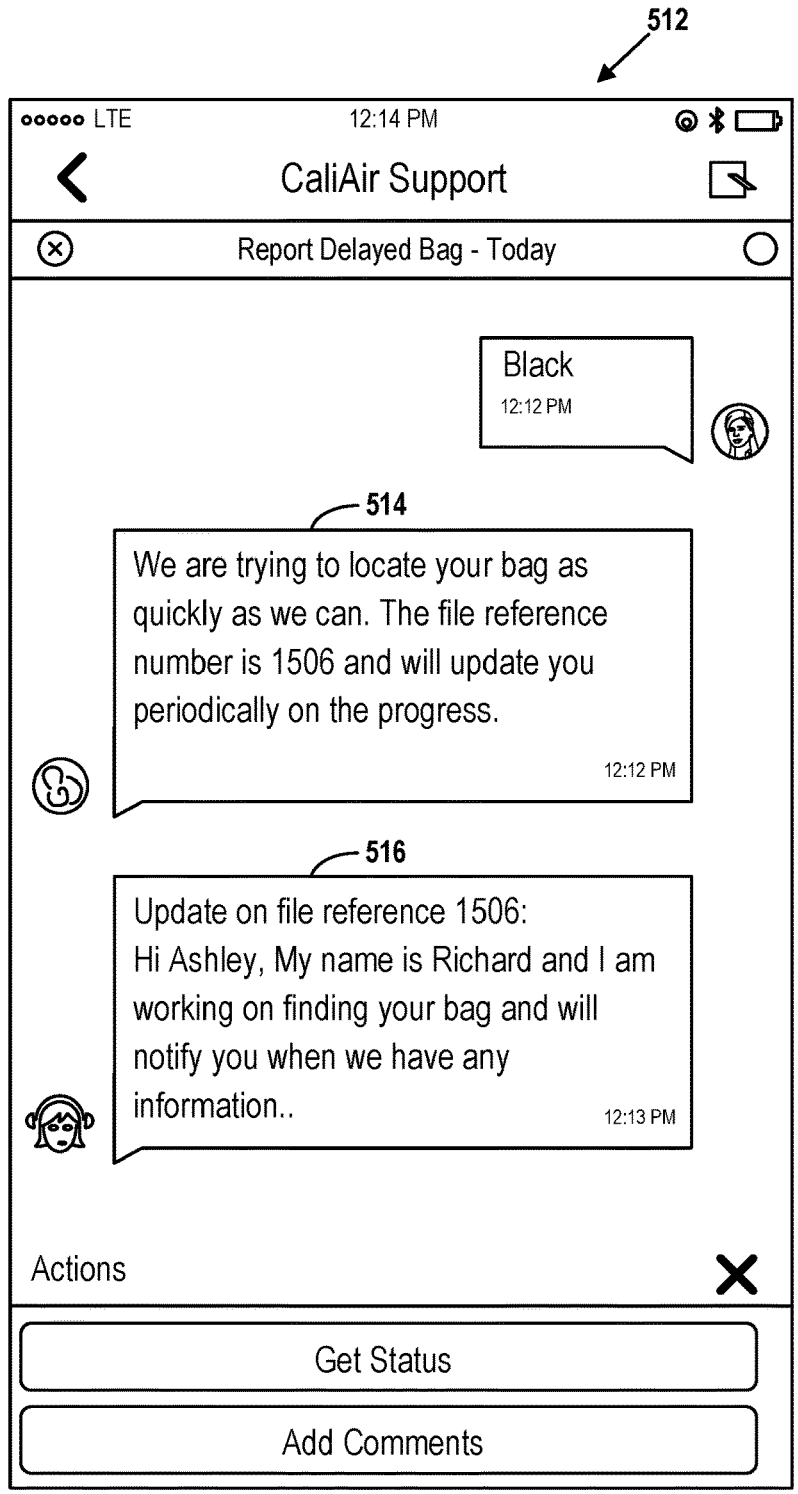
FIG. 5D illustrates an example GUI of the front-end computing system for interacting with the conversation-based system, in accordance with example embodiments.

FIG. 5D illustrates an example GUI 512 that displays a multimodal experience. In particular, as shown, the user's description of the delayed bag (e.g., "Black") prompts the system to provide the user with two types of messages: an automated message 514 and a non-automated message 516. The automated message 514 may inform the user that the system is attempting to locate the user's bag and also provides the user with a file reference number. Further, a remote live airline agent may enter the non-automated message 516 to be integrated into the conversation. In particular, the non-automated message 516 informs the user of the agent's name ("Richard," as shown) and confirms to the user that the airline is searching for her bag.

Figure 5E:
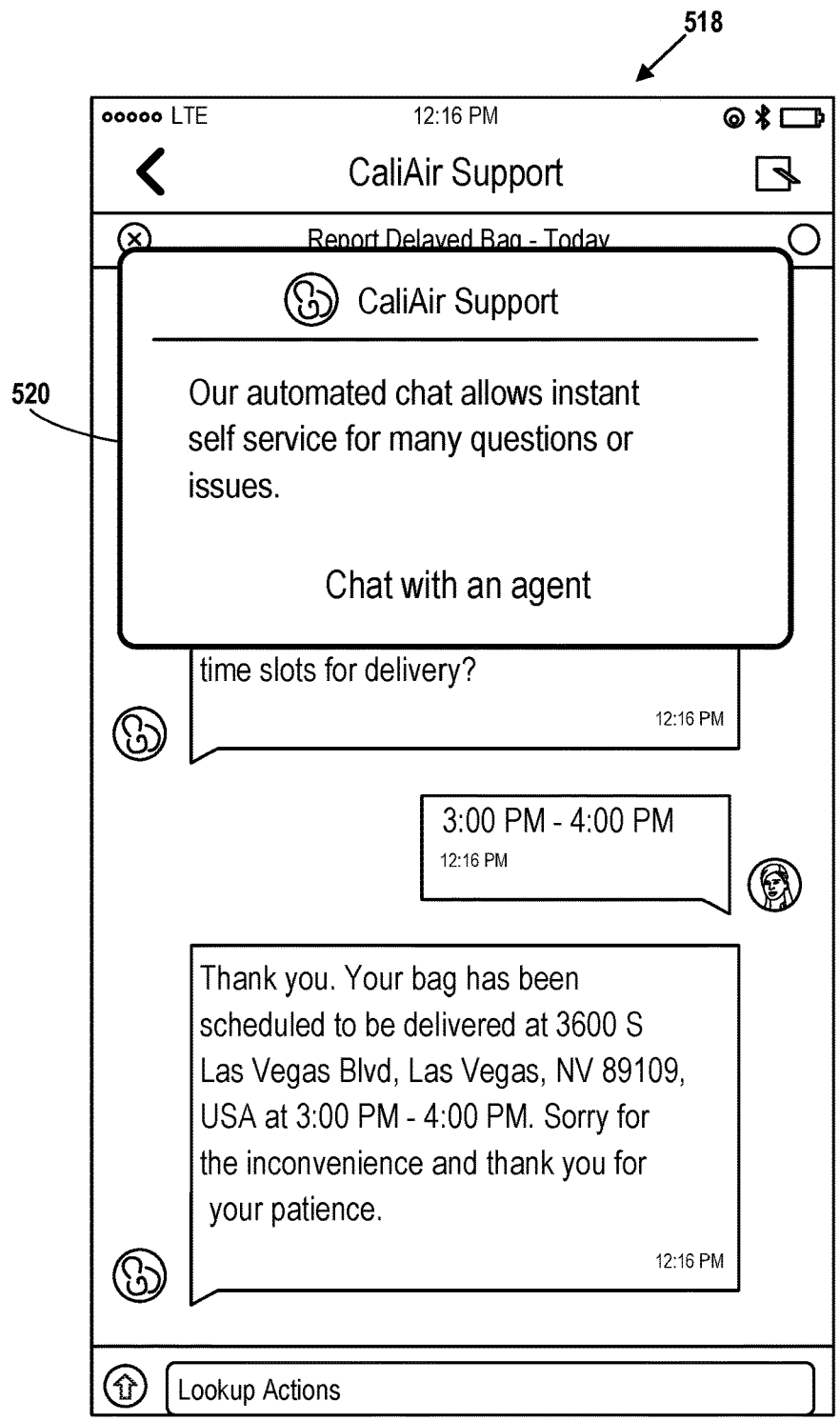
FIG. 5E illustrates an example GUI of the front-end computing system for interacting with the conversation-based system, in accordance with example embodiments.

FIG. 5E illustrates an example GUI 518 that displays a customer service option 520 provided by the airline company via the application to chat with an agent. In some scenarios, the conversation model may enable the user to connect with an agent even after one or more of the user's goals has been completed.

Figure 5F:
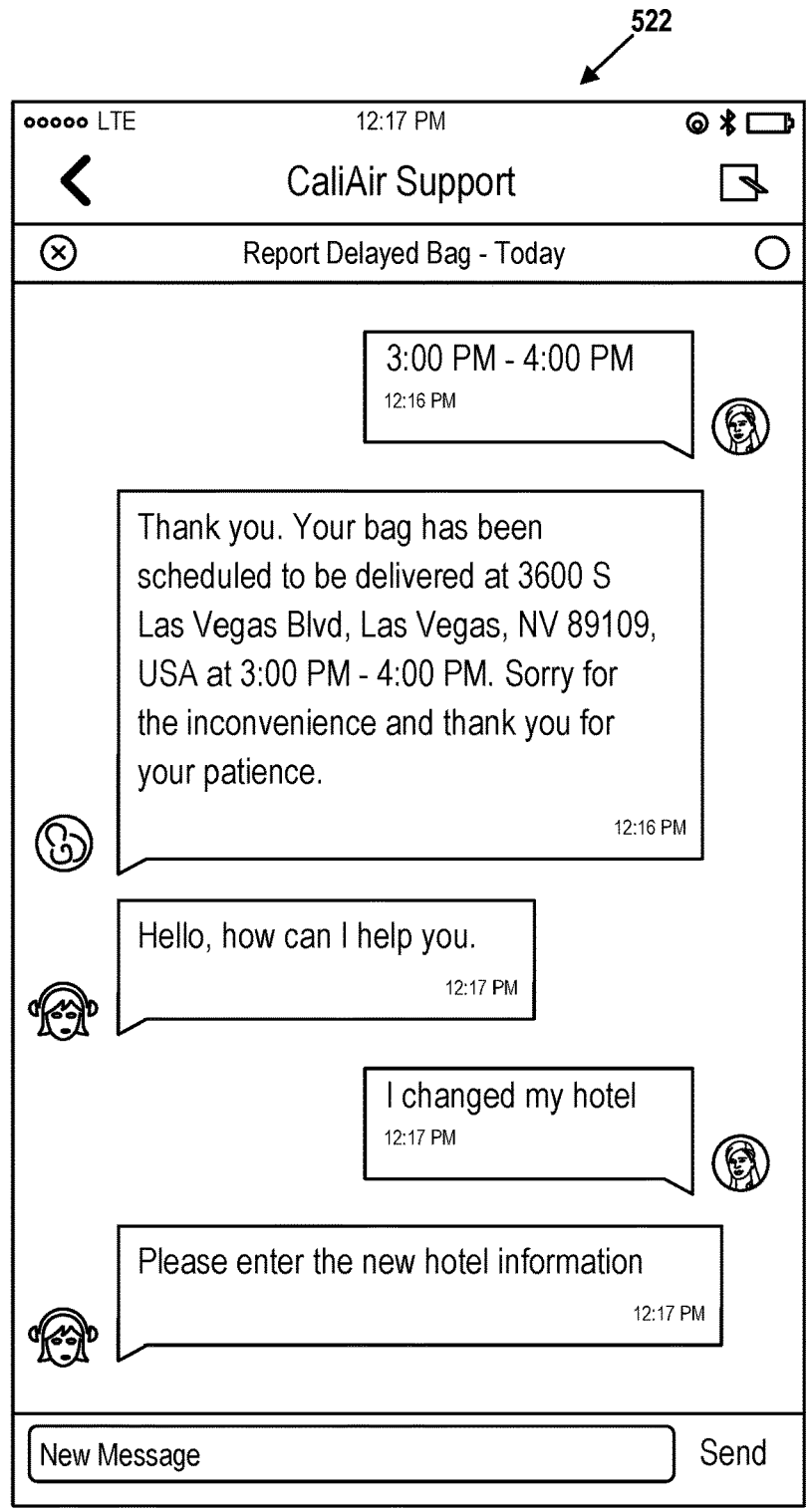
FIG. 5F illustrates an example GUI of the front-end computing system for interacting with the conversation-based system, in accordance with example embodiments.

FIG. 5F illustrates an example GUI 522 that displays a live conversation with an agent. In the scenario shown, the user informs the agent that the user changed a hotel in which the user is staying. Accordingly, the agent may intervene by updating the location at which the bag should be delivered.

Other GUIs may be displayed in practice for a variety of topics and corresponding to a variety of conversations. For instance, the airline conversation model discussed above may involve asking the user to provide a location to where the delayed bag should be forwarded and display a GUI including a map for the user to use to search for and select the address. The user may then respond by select a forwarding address on a map provided for the user. Further, the airline conversation model discussed above may involve displaying a GUI including a selection section and one or more selectable options that each correspond to a different time slot indicating when the bag may be delivered. Accordingly, the user may select the time during which the bag should be delivered to the identified location. As discussed above, the conversation-based system may import information from other sources such as the airline or other external sources to facilitate provision of certain services such as these. For instance, the selectable time slots may correspond to available times when the bag may be delivered, and the time slots may be based on various factors, such as time slots after the arrival of the next flight carrying the bag.

As discussed above, conversation models may be implemented on a variety of front-end computing devices via platforms other than a mobile application of the enterprise or the enterprise's client. Such other platforms may include a social media application. For instance, a user may use a social media messaging application to track a product purchased online or return or replace a product. In line with the discussion above, the user may input a request to "Track My Order" or "Return or Replace Item," and the system may then execute a corresponding conversation model on the user's device via the social media messaging application. Other examples are possible as well.

IV. Example Third-Party Application Integration

In some embodiments, a front-end computing device may be configured to access the conversation-based system via a third-party application installed on the front-end computing device. In particular, such a third-party application may take the form of a messaging application provided by a third-party entity with which the user has an account. The third-party application may take other forms as well.

A particular authentication procedure may be implemented in such embodiments. Through this procedure, the front-end computing device, one or more third-party computing devices, and the conversation-based system may interface to link the user's account for the third-party application with the user's account with the conversation-based system (e.g., a user's account with the enterprise that manages the conversation-based system). Once this has occurred, the conversation-based system may implement conversation models on the front-end computing system via the third-party application.

Some of the computing devices described below may be referred to as "cloud-based" devices, meaning that they may be housed at various remote data center locations. The exact physical location, connectivity, and configuration of these computing devices may be unknown and/or unimportant to front-end computing devices.

Figure 6:
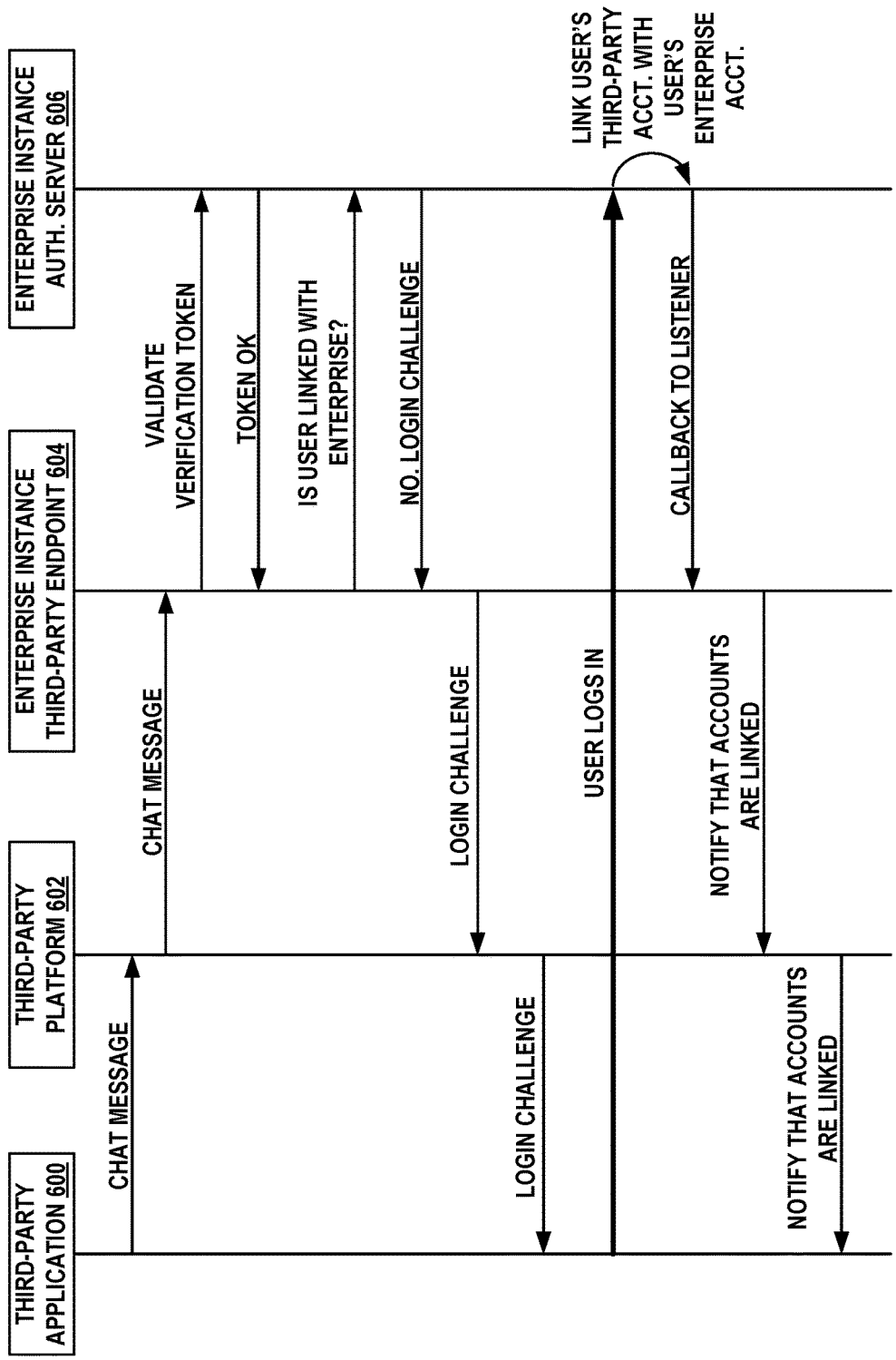
FIG. 6 is a ladder diagram, in accordance with example embodiments.

FIG. 6 illustrates operations of an example authentication procedure in the form of a ladder diagram. As shown, FIG. 6 illustrates various transactions and messages between a third-party application 600 (e.g., a third-party application running on a user's front-end computing device), a third-party platform 602 (e.g., a third-party-managed, cloud-based computing device, such as a server), an enterprise instance third-party endpoint 604 (e.g., an enterprise-managed, cloud-based computing device that is registered with the third-party application and that is configured to interface third-party devices with the enterprise system), and an enterprise instance authentication server 606 (e.g., an enterprise-managed, cloud-based server). In practice, the enterprise instance authentication server 606 may be configured to manage authentication procedures associated with third-party applications, and may additionally be configured to manage other types of authentication procedures as well. In other embodiments, the example authentication procedure may include more or less transactions and messages than those shown in FIG. 6, and/or may include more or less computing entities.

In accordance with the operations of FIG. 6, the third-party platform 602 may receive a chat message from the third-party application 600. This chat message may be a conversation initiation message intended for receipt by the conversation-based system. The message may be part of a conversation model or may be a message that the user sends via the third-party application 600 to request initiation of the execution of a conversation model on the front-end computing device. The third-party platform 602 may then transmit, to the enterprise instance third-party endpoint 604, the chat message as a string along with metadata that may include a verification token, a user's username, a name of the third-party application, and/or a name of a team to which the third-party application belongs, among other possible information.

Next, the enterprise instance third-party endpoint 604 may transmit the verification token to the enterprise instance authentication server 606 so that the enterprise instance authentication server 606 can then validate the verification token. The enterprise instance third-party endpoint 604 may transmit other information to the enterprise instance authentication server 606 as well, such as any of the metadata listed above, and the chat message itself. The enterprise instance authentication server 606 may then verify the authenticity of the chat message by verifying the verification token in the chat message against a token that has been registered by the third-party entity with the enterprise for the third-party application. Then, based on the metadata received by way of the third-party platform 602, the enterprise instance authentication server 606 may make a determination of whether the user's account with the third-party application has already been linked to the user's account with the enterprise.

If the determination is that the accounts have been linked, then the procedure may terminate and the user may be enabled to interface with the conversation-based system via the third-party application. On the other hand, if the determination is that the accounts have not been linked, the enterprise instance authentication server 606 may transmit a login challenge to the third-party application 600 via the enterprise instance third-party endpoint 604 and the third-party platform 602. The login challenge may take various forms. By way of example, the login challenge may take the form of a hyperlink or other type of link, and may prompt the user to enter the user's credentials for the user's account with the enterprise in order to trigger the user's account with the enterprise to be linked with the user's account with the third-party application. Once the user has clicked the link and logs in using the user's credentials for the user's enterprise account, the enterprise instance authentication server 606 may then link the user's enterprise account to the user's third-party application account. The user may thus be enabled to interface with the conversation-based system via the third-party application.

Furthermore, once the accounts have been linked, the enterprise instance authentication server 606 may transmit a callback message to the enterprise instance third-party endpoint 604, the receipt of which may trigger the enterprise instance third-party endpoint 604 to transmit to the third-party application 600, via the third-party platform 602, a notification that the accounts have been linked. The front-end computing system may then provide the user with the notification, such as by displaying the notification on a GUI for the third-party application.

In some embodiments, the enterprise instance authentication server 606 may append a message token to messages transmitted from an enterprise device to a third-party device (e.g., from the enterprise instance authentication server 606 to the third-party platform 602, by way of the enterprise instance third-party endpoint 604). This message token may be registered at the time an interface between the third-party device(s) and the enterprise device(s) is set up. The third-party device(s) may be configured to expect such a message token with every message that it receives from the enterprise, or else the third-party device(s) may disregard the message. Further, these message tokens, as well as tokens for messages that the enterprise device(s) received from the third-party device(s), may be cached by each such device.

The procedure described above might occur only upon a user's first time accessing the conversation-based system via the third-party application, and/or may occur at other times, such as after a threshold amount of time has passed since the user last accessed the system, after the third-party application has been uninstalled and then reinstalled on the user's device, etc.

V. Example Operations

Figure 7:
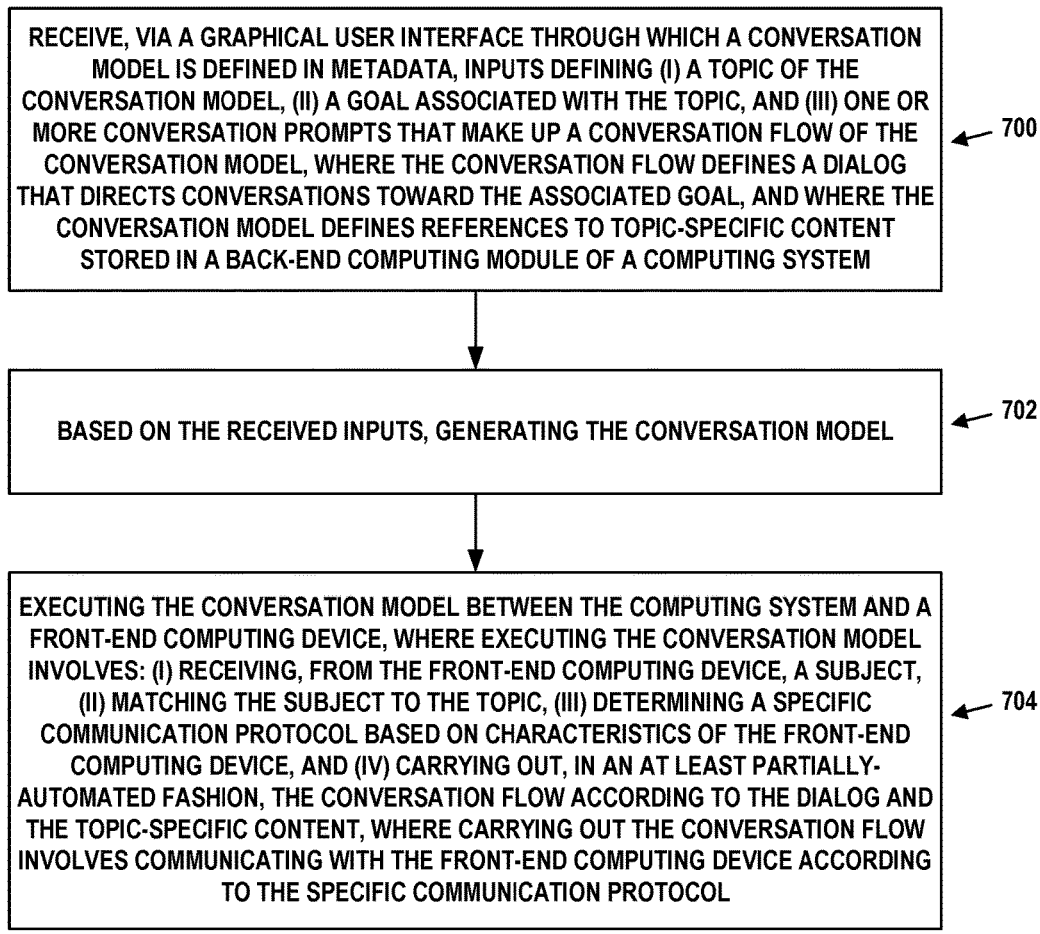
FIG. 7 is a flow chart, in accordance with example embodiments.

FIG. 7 is a flow chart illustrating an example embodiment. The process illustrated by FIG. 7 may be carried out by a computing device, such as computing device 300, and/or a group of computing devices, such as the modules of the conversation-based system (e.g., conversation-based system 200) described herein. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or as otherwise described herein.

Block 700 may involve receiving, by a computing system, via a graphical user interface through which a conversation model is defined in metadata, inputs defining (i) a topic of the conversation model, (ii) a goal associated with the topic, and (iii) one or more conversation prompts that make up a conversation flow of the conversation model. The conversation flow may define a dialog that directs conversations toward the associated goal. And the conversation model may define references to topic-specific content stored in a back-end computing module of the computing system.

Block 702 may involve based on the received inputs, generating, by the computing system, the conversation model.

Block 704 may involve executing, by the computing system, the conversation model between the computing system and a front-end computing device, where execution of the conversation model involves (i) receiving, from the front-end computing device, a subject; (ii) matching the subject to the topic; (iii) determining a specific communication protocol based on characteristics of the front-end computing device; and (iv) carrying out, in an at least partially-automated fashion, the conversation flow according to the dialog and the topic-specific content, where carrying out the conversation flow involves communicating with the front-end computing device according to the specific communication protocol.

In some embodiments, the computing system may generate the conversation model further based on additional inputs as well. For example, the computing system may receive, via the graphical user interface, additional inputs representing a plurality of conversation snippets associated with the goal, and may use these received additional inputs as a further basis for generating the conversation model. Each conversation snippet may be representative of a single prompt provided by the computing system to the front-end computing device, and at least one conversation snippet may be associated with a potential response to a preceding conversation snippet received by the computing system from the front-end computing device.

Additionally or alternatively, as another example, the computing system may receive, via the graphical user interface, additional inputs representing one or more fields, and may use these received additional inputs as a further basis for generating the conversation model. The topic of the conversation model may include the one or more fields, and the one or more fields may define information that the computing system is to request from the front-end computing device during the conversation flow for the conversation model.

Additionally or alternatively, as another example, the computing system may receive, via the graphical user interface, additional inputs representing one or more keywords, and may use these received additional inputs as a further basis for generating the conversation model. The topic of the conversation model may include the one or more keywords, and the one or more keywords may define terms or phrases that the computing system predicts to be received from the front-end computing device during an initial stage of the conversation flow for the conversation model.

In some embodiments, carrying out the conversation flow for the conversation model in the at least partially-automated fashion may involve carrying out the conversation flow for the conversation model in a fully-automated fashion, without involvement of the remote live agent.

In some embodiments, carrying out the conversation flow for the conversation model in the at least partially-automated fashion may involve carrying out the conversation flow for the conversation model in a partially-automated fashion, and involving the remote live agent in the conversation model for at least a portion of the conversation flow.

In some embodiments, the computing system may be managed by an enterprise, and the conversation model may correspond to a service provided by a third-party client of the enterprise to consumers of the third-party client.

In some embodiments, the computing system may include a back-end computing module that stores the topic-specific content, a conversation design module that is configured to perform operations such as the operations of Blocks 700 and 702, and/or a conversation execution module that is configured to perform operations such as the operations of Block 704.

In some embodiments, the conversation execution module may include a protocol adapter configured for connecting the conversation execution module with the front-end computing device and carrying out the conversation flow with the front-end computing device according to the specific communication protocol.

In some embodiments, the conversation execution module may include an application programming interface connector configured to connect the conversation execution module with the topic-specific content.

In some embodiments, the conversation execution module may be configured to set up integration of a remote live agent into the conversation model.

In some embodiments, the computing system may include a back-end computing module having stored topic-specific content. In these embodiments, the computing system may also include a conversation design module configured to provide a graphical user interface through which a plurality of different conversation models are defined in metadata. Each conversation model may include a topic, the topics may contain respective goals, and the goals may be associated with respective conversation flows that define respective dialogs that direct conversations toward the associated goals. Further, each conversation model may also define references to the topic-specific content. In these embodiments, the computing system may also include a conversation execution module including a plurality of protocol adapters, an application programming interface connector, and a conversation manager.

Each of the plurality of protocol adapters may be configured for (a) connecting the conversation execution module with respective front-end computing devices based on characteristics of the respective front-end computing devices, and (b) carrying out respective conversation flows with the front-end computing devices according to specific communication protocols for each of the front-end computing devices. The application programming interface connector may be configured to connect the conversation execution module with the corresponding topic-specific content. The conversation manager may be configured to (a) execute a particular conversation model between the computing system and a particular front-end computing device of the at least one front-end computing device, and (b) set up integration of a remote live agent into the particular conversation model.

In these embodiments, execution of the particular conversation model between the computing system and the particular front-end computing device may involve receiving, from the particular front-end computing device, a subject. Such execution may further involve matching the subject to the topic of the particular conversation model. Such execution may further involve determining a particular specific communication protocol from the specific communication protocols based on characteristics of the particular front-end computing device. And such execution may further involve carrying out, in an at least partially-automated fashion, the conversation flow for the particular conversation model according to the dialog and the topic-specific content corresponding to the particular conversation model. Carrying out the conversation flow may involve communicating with the particular front-end computing device according to the particular specific communication protocol.

Furthermore, in some embodiments, the conversation design module may be configured to receive, via the graphical user interface, inputs representing the topics of the particular conversation model, the goals for each topic, and, for each goal, a plurality of conversation snippets. Each conversation snippet may be representative of a single prompt provided by the computing system to the particular front-end computing device, and at least one conversation snippet may be associated with a potential response to a preceding conversation snippet received by the computing system from the particular front-end computing device. Further, the conversation design module may be configured to generate the particular conversation model based on the received inputs.

In some embodiments, each topic may include one or more fields that define information that the computing system is to request from the particular front-end computing device during the conversation flow for the particular conversation model. In these embodiments, the conversation design module may be configured to receive, via the graphical user interface, additional inputs representing the one or more fields, and generate the particular conversation model further based on the received additional inputs.

In some embodiments, each topic may include one or more keywords that define terms or phrases that the computing system predicts to be received from the particular front-end computing device during an initial stage of the conversation flow for the particular conversation mode. In these embodiments, the conversation design module may be configured to receive, via the graphical user interface, additional inputs representing the one or more keywords, and generate the particular conversation model further based on the received additional inputs.

In some embodiments, carrying out the conversation flow for the particular conversation model in the at least partially-automated fashion may involve carrying out the conversation flow for the particular conversation model in a fully-automated fashion, without involvement of the remote live agent.

In some embodiments, carrying out the conversation flow for the particular conversation model in the at least partially-automated fashion may involve carrying out the conversation flow for the particular conversation model in a partially-automated fashion, and may also involve involving the remote live agent in the particular conversation model for at least a portion of the conversation flow.

In some embodiments, setting up integration of the remote live agent into the particular conversation model may involve providing for display, on one or more of a remote computing device of the remote live agent and a display device of the computing system, the conversation flow of the particular conversation model that was carried out before the integration of the remote live agent into the particular conversation model.

In some embodiments, the computing system may be managed by an enterprise, and the back-end computing module may have stored a plurality of topic-specific content. Each topic-specific content may correspond to, and be tailored to, a distinct third-party client of the enterprise. Further, the plurality of different conversation models may include, for each third-party client, at least one conversation model that defines references to the topic-specific content corresponding to the third-party client.

In some embodiments, each conversation model may correspond to a respective service provided by an enterprise to consumers of the enterprise and/or a respective service provided by a third-party client of the enterprise to consumers of the third-party client of the enterprise.

In some embodiments, each of the plurality of protocol adapters may be further configured for carrying out conversation flows with the front-end computing devices via a third-party application installed on the front-end computing devices.

VI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:
1. A computing system comprising:
   a automated conversation execution module configured to execute a conversation model between the computing system and a front-end computing device, and establish integration of a live agent into the conversation model, wherein the conversation model includes a topic, the topic being associated with one or more goals, wherein respective goals of the one or more goals are associated with respective conversation flows that define respective rules-based dialogs that direct conversations toward the one or more goals, wherein the conversation model defines one or more points during execution of the conversation model at which to invoke the integration of the live agent, wherein the integration of the live agent comprises communication between the live agent and the front-end computing device to address at least one of the one or more goals, and wherein the conversation model is designed based on one or more inputs received via a graphical user interface provided by the computing system to define the topic, the one or more goals, the respective conversation flows, and the one or more points; and memory storing conversation data that represents a conversation flow of the conversation model between the computing system and the front-end computing device,
wherein execution of the conversation model between the computing system and the front-end computing device comprises:
receive one or more user inputs indicative of a subject from the front-end computing device;
carrying out the conversation flow between the front-end computing device and the automated conversation execution module based on the one or more user inputs to produce the conversation data;
determining that the integration of the live agent has been invoked at one of the one or more points defined by the conversation model;
in response to determining that the integration of the live agent has been invoked at one of the one or more points defined by the conversation model, integrating the live agent into the conversation model; and
providing for display, on a computing device of the live agent, the conversation data.

2. The computing system of claim 1, wherein the conversation model defines which of the one or more goals support the one or more points during execution of the conversation model at which to invoke the integration of the live agent.

3. The computing system of claim 1, wherein carrying out the conversation flow between the front-end computing device and the automated conversation execution module comprises sending, to the front-end computing device, automated messages as part of the conversation flow, and wherein execution of the conversation model between the computing system and the front-end computing device further comprises discontinuing the sending of the automated messages as part of the conversation flow while the live agent is integrated into the conversation model.

4. The computing system of claim 1, wherein integrating the live agent into the conversation model comprises establishing a live video call between the computing device of the live agent and the front-end computing device.

5. The computing system of claim 1, wherein integrating the live agent into the conversation model comprises establishing a live audio call between the computing device of the live agent and the front-end computing device.

6. The computing system of claim 1, wherein execution of the conversation model between the computing system and the front-end computing device further comprises:
receiving, from the computing device of the live agent, response data provided by the live agent for integration into the conversation flow; and
integrating the response data into the conversation flow.

7. The computing system of claim 6, wherein the response data includes one or more of: audio data, video data, or text data.

8. The computing system of claim 1, wherein the one or more points defined by the conversation model include at least one point during execution of the conversation model at which to provide the front-end computing device with a selectable option for invoking the integration of the live agent, and wherein determining that the integration of the live agent has been invoked at one of the one or more points defined by the conversation model comprises receiving input representing selection of the selectable option for invoking the integration of the live agent.

9. The computing system of claim 1, wherein the one or more points defined by the conversation model include at least one point during execution of the conversation model at which to automatically trigger integration of the live agent.

10. The computing system of claim 1, further comprising:
a conversation design module configured to provide the graphical user interface through which the conversation model is defined and further configured to receive, via the graphical user interface, input representing whether at least one goal of the one or more goals will integrate the live agent into the conversation model.

11. The computing system of claim 1, wherein at least one of the one or more points defined by the conversation model includes a point after the one or more goals have been addressed.

12. A method comprising:
receive one or more user inputs indicative of a subject from a front-end computing device;
carrying out, between the front-end computing device and an automated conversation execution module of a computing system, a conversation flow of a conversation model based on the one or more user inputs, wherein the conversation model includes a topic, the topic being associated with one or more goals, wherein respective goals of the one or more goals are associated with respective conversation flows that define respective rules-based dialogs that direct conversations toward the one or more goals, wherein the conversation model defines one or more points during execution of the conversation model at which to invoke integration of a live agent into the conversation model, wherein the integration of the live agent comprises communication between the live agent and the front-end computing device to address at least one of the one or more goals, wherein carrying out the conversation flow produces conversation data that represents the conversation flow of the conversation model between the computing system and the front-end computing device, and wherein the conversation model is designed based on one or more inputs received via a graphical user interface provided by the computing system to define the topic, the one or more goals, the respective conversation flows, and the one or more points;
determining that the integration of the live agent has been invoked at one of the one or more points defined by the conversation model;
in response to determining that the integration of the live agent has been invoked at one of the one or more points defined by the conversation model, integrating the live agent into the conversation model; and
providing for display, on a computing device of the live agent, the conversation data.

13. The method of claim 12, wherein the conversation model defines which of the one or more goals support the one or more points during execution of the conversation model at which to invoke the integration of the live agent.

14. The method of claim 12, wherein carrying out the conversation flow between the front-end computing device and the automated conversation execution module comprises sending, to the front-end computing device, automated messages as part of the conversation flow, the method further comprising:
discontinuing the sending of the automated messages as part of the conversation flow while the live agent is integrated into the conversation model.

15. The method of claim 12, further comprising:
- receiving, from the computing device of the live agent, response data provided by the live agent for integration into the conversation flow; and
- integrating the response data into the conversation flow.

16. The method of claim 12, wherein the one or more points defined by the conversation model include at least one point during execution of the conversation model at which to provide the front-end computing device with a selectable option for invoking the integration of the live agent, and wherein determining that the integration of the live agent has been invoked at one of the one or more points defined by the conversation model comprises receiving input representing selection of the selectable option for invoking the integration of the live agent.

17. The method of claim 12, wherein the one or more points defined by the conversation model include at least one point during execution of the conversation model at which to automatically trigger integration of the live agent.

18. An article of manufacture including a non-transitory computer-readable medium, having stored thereon program instructions that, upon execution by a computing system, cause the computing system to perform operations comprising:
- receive one or more user inputs indicative of a subject from a front-end computing device;
- carrying out, between the front-end computing device and an automated conversation execution module of the computing system, a conversation flow of a conversation model, wherein the conversation model includes a topic, the topic being associated with one or more goals, wherein respective goals of the one or more goals are associated with respective conversation flows that define respective rules-based dialogs that direct conversations toward the one or more goals, wherein the conversation model defines one or more points during execution of the conversation model at which to invoke integration of a live agent into the conversation model, and wherein the integration of the live agent comprises communication between the live agent and the front-end computing device to address at least one of the one or more goals, wherein carrying out the conversation flow produces conversation data that represents the conversation flow of the conversation model between the computing system and the front-end computing device, and wherein the conversation model is designed based on one or more inputs received via a graphical user interface provided by the computing system to define the topic, the one or more goals, the respective conversation flows, and the one or more points;
- determining that the integration of the live agent has been invoked at one of the one or more points defined by the conversation model;
- in response to determining that the integration of the live agent has been invoked at one of the one or more points defined by the conversation model, integrating the live agent into the conversation model; and
- providing for display, on a computing device of the live agent, the conversation data.

19. The article of manufacture of claim 18, wherein the conversation model defines which of the one or more goals support the one or more points during execution of the conversation model at which to invoke the integration of the live agent.

20. The article of manufacture of claim 18, wherein carrying out the conversation flow between the front-end computing device and the automated conversation execution module comprises sending, to the front-end computing device, automated messages as part of the conversation flow, the operations further comprising:
- discontinuing the sending of the automated messages as part of the conversation flow while the live agent is integrated into the conversation model.

* * * * *